(12) United States Patent
Maeda et al.

(10) Patent No.: US 6,321,217 B1
(45) Date of Patent: *Nov. 20, 2001

(54) DATA ANALYZING METHOD FOR GENERATING RULES

(75) Inventors: Akira Maeda; Hitoshi Ashida, both of Yokohama; Yoji Taniguchi, Ikeda; Yukiyasu Ito, Ebina; Yori Takahashi, Yokohama, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/301,595

(22) Filed: Apr. 29, 1999

Related U.S. Application Data

(63) Continuation of application No. 08/993,150, filed on Dec. 18, 1997, now Pat. No. 5,940,815, which is a continuation of application No. 08/470,217, filed on Jun. 6, 1995, now Pat. No. 5,761,389.

(51) Int. Cl.[7] .................................................... G06F 17/00
(52) U.S. Cl. ................................ 706/47; 706/45; 706/48; 706/59; 706/61
(58) Field of Search ................................. 706/45–48, 59, 706/61

(56) References Cited

U.S. PATENT DOCUMENTS

| 4,839,822 | 6/1989 | Dormond et al. | 706/47 |
|---|---|---|---|
| 4,970,657 | 11/1990 | Wolf | 706/47 |
| 5,129,043 | 7/1992 | Yue | 706/47 |
| 5,283,856 | 2/1994 | Gross et al. | |

(List continued on next page.)

OTHER PUBLICATIONS

Yazici, "Representing Imprecise Information in NF Relations, " Proceedings of IEEE Southeastcon '90, vol. 3, pp. 1026–1030, Apr. 1990.*

R. Agrawal et al., "Database Mining: A Performance Perspective," IEEE Transactions on Knowledge and Data Engineering, vol. 5, No. 6, pp. 914–925, Dec. 1993.*

J. Han et al., "Knowledge Discovery in Databases: An Attribute–Oriented Approach," Proceedings of the 18th VLDB Conference, pp. 547–559, Aug. 1992.*

J. Han et al., "Data–Driven Discovery of Quantitative Rules in Relational Databases," IEEE Transactions on Knowledge and Data Engineering, vol. 5, No. 1, pp. 29–40, Feb. 1993.*

R. Agrawal et al., "Mining Association Rules Between Sets of Items in Large Databases," Proceedings of 1993 ACM SIGMOD International Conference on Management of Data, pp. 207–216, May 1993.*

(List continued on next page.)

*Primary Examiner*—George B. Davis
(74) *Attorney, Agent, or Firm*—Antonelli, Terry, Stout & Kraus, LLP

(57) ABSTRACT

A data analyzing method for generating a rule based on data items in a data base, wherein the rule expresses relational features of the data items. The invention includes a user interface and a rule generation module. The rule generation module, in response to an input from the user via the user interface, selects data items for use in a conditional clause and a conclusion clause of a rule from the data items stored in the data base, converts, when the selected data items have numerical values, the numerical values into symbolic values and creates plural candidate rules each expressing a correlation between selected data items in a rule form having one or plural sets of item names and symbolic values. The rule generation module further calculates a criterion for evaluating strength of correlation between data items in each of the candidate rules, determines one or plural candidate rules having highest calculated criterion from the candidate rules, and outputs to the user via the user interface the one or plural candidate rules.

4 Claims, 15 Drawing Sheets

U.S. PATENT DOCUMENTS

| | | | |
|---|---|---|---|
| 5,422,984 | * | 6/1995 | Iokibe et al. ............................. 706/12 |
| 5,465,320 | | 11/1995 | Enbutsu et al. ......................... 706/23 |
| 5,504,840 | * | 4/1996 | Hiji et al. ................................ 706/61 |
| 5,579,439 | | 11/1996 | Khan ........................................ 706/2 |
| 5,692,107 | * | 11/1997 | Simoudis et al. ....................... 706/12 |
| 5,701,400 | | 12/1997 | Amado ................................... 706/47 |
| 5,732,191 | | 3/1998 | Kunemund et al. ..................... 706/8 |
| 5,761,389 | * | 6/1998 | Maeda et al. ........................... 706/59 |

OTHER PUBLICATIONS

M. Klemettinen et al., "Finding Interesting Rules from Large Sets of Discovered Association Rules," Proceedings of the 3rd Internation Conference on Information and Knowledge Management, pp. 401–407, Dec. 1994.*

Quilan, J. Ross, *Learning Efficient Classification Procedures and Their Application to Chess End Games*, pp. 463–483.

Database mining; Extracting and synthesizing useful information from huge data banks provides a competitive edge in direct marketing (6 pages).

Hitachi; Data Front Neurolive ES/TOOL2/W–RI; pp. 1–10.

* cited by examiner

FIG. 1

| MASTER LOT NO. | WASHING METHOD | COATING METHOD | SHORT-CIRCUIT OF A SINGLE-LAYER A1 WIRE | SHORT-CIRCUIT OF TWO-LAYER A1 WIRE | TH CONDUCTION | ... | POWER FAILURE | MEMORY FAILURE | PERCENT TOTAL FAILURE |
|---|---|---|---|---|---|---|---|---|---|
| TH5A0237 | METHOD 1 | METHOD A | 5.1% | 2.1% | 0.2% | ... | 6.3% | 32.5% | 42.2% |
| TH5A0238 | METHOD 2 | METHOD A | 0.2% | 7.0% | 0.0% | ... | 23.6% | 12.2% | 49.1% |
| TB1C0093 | METHOD 1 | METHOD B | 3.3% | 3.5% | 1.2% | ... | 4.4% | 1.9% | 6.8% |
| .. | .. | .. | .. | .. | .. | .. | .. | .. | .. |

FIG. 2

| CUSTOMER NO. | NAME | AGE | SEX DISTINC- TION | ADDRESS | BRANCH CODE | PRE- FECTURE CODE | DISTRICT CODE | DEPOSIT BAL. | LOAN BAL. | CREDIT CARD | ... | PURCHASE COMMODITY |
|---|---|---|---|---|---|---|---|---|---|---|---|---|
| 0158001 | ICHIRO HONDA | 35 | MAN | SETAGAYA-KU, TOKYO | 108 | 25 | 3 | 250 | 1200 | YES | | YES |
| 2048002 | KAZUO HOSOKAWA | 58 | MAN | MIDORIKU, YOKOHAMA CITY | 121 | 26 | 3 | 1200 | 510 | YES | | YES |
| 3398024 | TOMOMI ASAKURA | — | WOMAN | ASHYA CITY, HYOGO PREFECTURE | 257 | 37 | 5 | 120 | 340 | NO | | NO |
| 1259842 | MICHIHIKO UESUGI | 42 | MAN | — | 292 | 42 | 6 | 840 | 920 | NO | | YES |
| .. | .. | .. | .. | .. | .. | .. | .. | .. | .. | .. | | .. |
| 0912637 | SHOUHEI HARADA | 42 | MAN | FUKUOKA CITY, FUKUOKA PREFECTURE | 359 | 46 | 7 | 780 | 0 | YES | | NO |

FIG. 5A

| CUSTOMER NO. | NAME | AGE | SEX DISTINC-TION | ADDRESS | BRANCH CODE | DEPOSIT BALANCE | LOAN BALANCE | CREDIT CARD |
|---|---|---|---|---|---|---|---|---|
| 0158001 | ICHIRO HONDA | 35 | MAN | SETAGAYA-KU, TOKYO | 108 | 250 | 1200 | YES |

CUSTOMER INFORMATION TABLE

FIG. 5B

| BRANCH CODE | PRE-FECTURE CODE | DISTRICT CODE | NAME OF BRANCH MANAGER |
|---|---|---|---|
| 108 | 25 | 3 | AKIO MATSUDAIRA |

BRANCH INFORMATION TABLE

FIG. 5C

| CUSTOMER NO. | PURCHASE COMMODITY |
|---|---|
| 0158001 | YES |

COMMODITY PURCHASE HISTORY TABLE

LIST OF CONVERSION METHODS TO SYMBOLIC VALUES

| ITEM NAME | NUMBER OF SYMBOL | SYMBOL NAME | CONVERSION METHOD |
|---|---|---|---|
| AGE | 5 | LESS THAN 20 \| 20's \| 30's \| 40's \| 50 OR MORE | DESIGNATION BY USER (CRISP) |
| DEPOSIT BALANCE | 3 | LITTLE \| ORDINARY \| MUCH | EQUAL NUMBER DIVISION (FUZZY) |
| LOAN BALANCE | 3 | SMALL \| MEDIUM \| LARGE | EQUAL RANGE DIVISION (FUZZY) |

(DEFAULT) (END) (CANCEL)

```
┌─────────────────────────────────────────────────────────────┐
│  SETTING OF CONVERSION METHOD TO SYMBOLIC VALUE             │
├─────────────────────────────────────────────────────────────┤
│  CONVERSION METHODS                 ┌1001    NUMBER OF      │
│  TO SYMBOLIC VALUE                           SYMBOL         │
│  ┌──────────────────────────────────────┐    ┌───┐          │
│  │  ◉ EQUAL NUMBER DIVISION             │    │ 3 │          │
│  │                                      │    └───┘          │
│  │  ○ EQUAL RANGE DIVISION              │    1002           │
│  │                                      │    ┌─────┐        │
│  │  ○ AVERAGE / STANDARD DEVIATION      │    │ END │        │
│  │    DIVISION                          │    └─────┘        │
│  │                                      │    1007           │
│  │  ○ USER DESIGNATED DIVISION          │    ┌────────┐     │
│  ├──────────────────────────────────────┤    │ CANCEL │     │
│  │                                      │    └────────┘     │
│  │  ◉ CRISP DIVISION                    │    1008           │
│  │                                      │                   │
│  │  ○ FUZZY DIVISION                    │                   │
│  └──────────────────────────────────────┘                   │
└─────────────────────────────────────────────────────────────┘
```

| SYMBOL NAME | MINIMUM VALUE | MAXIMUM VALUE | NUMBER OF RECORD |
|---|---|---|---|
| SMALL | 0 | 499 | 193 |
| MEDIUM | 500 | 999 | 202 |
| LARGE | 1000 | 100000 | 189 |

1003　　　1004　　　1005　　　1006

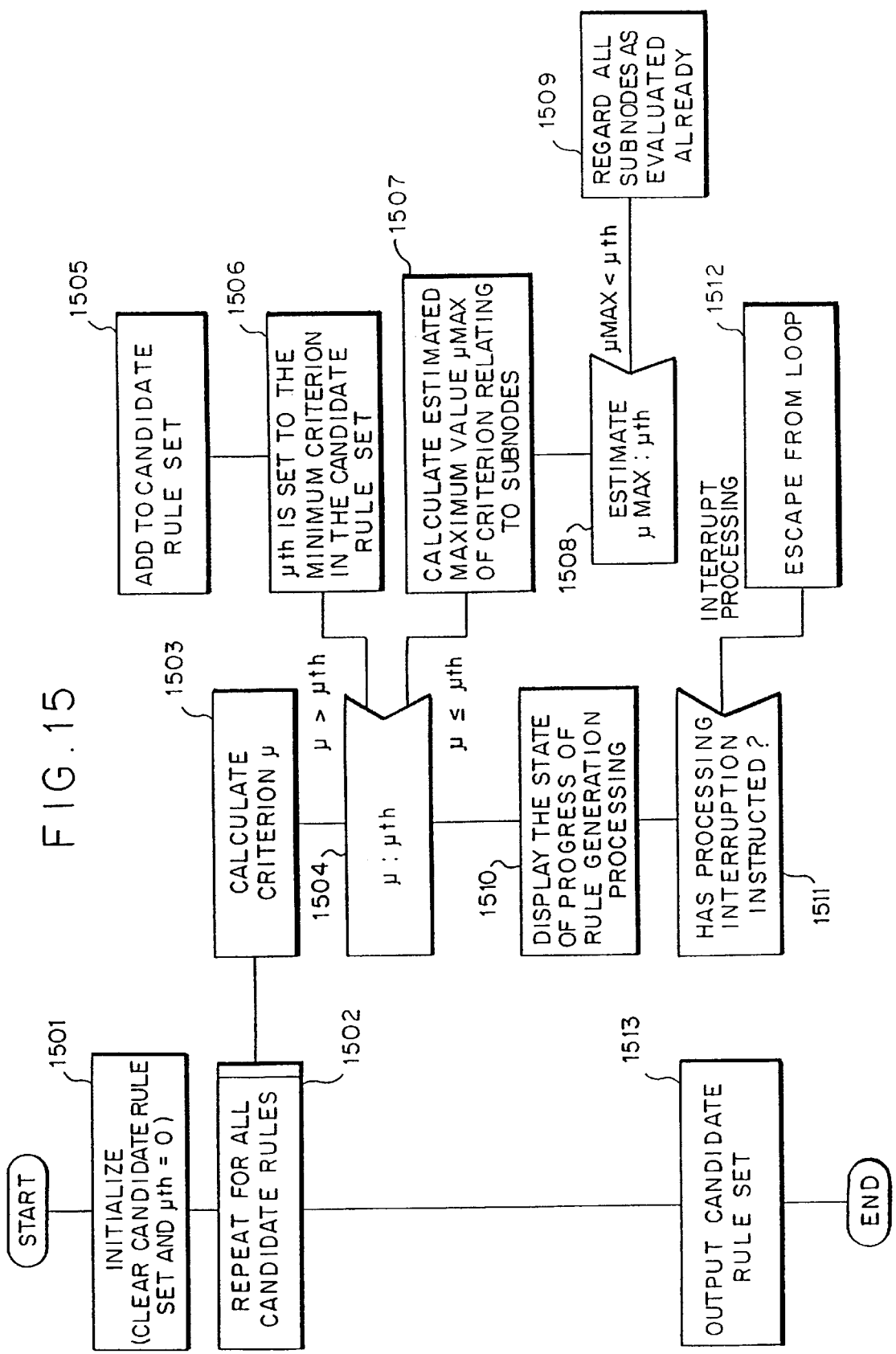

DATA ANALYZING METHOD FOR GENERATING RULES

CROSS-REFERENCE TO RELATED APPLICATION

This application is a continuation of application Ser. No. 08/993,150, filed Dec. 18, 1997, U.S. Pat. No. 5,940,815, which is a continuation of application Ser. No. 08/470,217, filed Jun. 6, 1995, U.S. Pat. No. 5,761,389.

BACKGROUND OF THE INVENTION

The present invention relates to a data analyzing method and system for analyzing a collection of data expressed in terms of numeric values or symbols which are stored in an information storage unit as a data base. More particularly the present invention relates to data analyzing method and system for analyzing a collection of data in a data base and processing and converting the analyzed data to obtain an expression or rule useful to users.

With the advancement of the computer technology, the volume of data accumulated in a computer has been increased year by year. This tendency is becoming more and more remarkable mainly in on-line systems as networking advances. At present, one million in terms of the number of records, which corresponds to giga (=$10^9$) bytes, is by no means rare.

Data stored in a computer are a mere collection of numerical values or symbols. In view of this point there have been proposed techniques for converting such a collection of data into information useful to users to thereby attain an effective utilization of the data. The method known most widely is a statistical method involving correlation analysis and multiple regression analysis.

Further, as a relatively new method there is known a method involving conversion into a rule form easily understandable to users such as IF, THEN rules (if . . . , then . . . is . . . ,) that is, a method which uses a knowledge acquisition method called rule induction. For example, on pages 23~31 of Hitachi Creative Work Station 2050 (trade name) ES/TOOL/W-RI Explanation/Operation Manual there is described a method which expresses a relation present between data in the form of a rule.

The method originally aimed at creating from given data a rule capable of being inputted to an expert system. However, such a method is applicable to the purpose that a user as a human is to find out characteristics such as causality and regularity which are contained in stored data.

The above described conventional method aims at creating a rule capable of being utilized by a computer. Although it is possible for the user as a human to interpret the rule, the rule is not formed in an easily understandable form to the human. Thus it has been impossible to create a rule suitable for a human to interpret the rule and understand characteristics of the data used. The above described method will be explained in more detail below using various examples.

First, suppose that data is a collection of individual events. For example, in an application method of analyzing the cause of a semiconductor defect by using a quality control data base in a semiconductor manufacturing process, each individual case is managed in a manufacturing unit called wafer, and a set of information pieces such as processing parameters in each manufacturing step or various test results can be handled as one case. FIG. 1 shows examples of such data.

In a method of checking a financial commodity purchasing trend of each customer from a customer data base kept by a bank, a set of such information pieces for each customer as age, deposit balance, occupation, annual income and financial commodity purchasing history is one case, and the data to be analyzed can be regarded as a collection of such data. As to this example, a detailed explanation will be given in an embodiment of the invention which will be described rater.

Reference will now be made to an example of forming a rule according to the above described conventional method. As an example, suppose that features common to customers who have bought a certain financial commodity ("commodity A" hereinafter) are to be checked. In this case, it is an object to create a rule for classifying as accurately as possible between cases corresponding to the customers who have bought the commodity A and cases corresponding to the customers who have not bought the same commodity.

According to the foregoing conventional method, from among sets of item values (e.g. "The age is 40 or more and the deposit balance is 10,000,000 yen or more."), there is created a set which classifies given data most accurately. In this case, the term "accurately" is used in the following sense. In a subset of cases having specific values, the higher the proportion of the cases corresponding to the customers who have bought the financial commodity A, the more accurately are classified features of those customers. This set of values can be expressed in the form of a rule such as "IF the age is 40 or more and AND the deposit balance is 10,000,000 yen or more, THEN purchase the financial commodity A."

Next, the case which is explained by the created rule is removed from the entire set of cases. In the above example, the case which satisfies the condition of the age being 40 or more and the deposit balance 10,000,000 yen or more is removed. With respect to the remaining set of cases, there is determined a set of items which makes classification most accurately. By repeating these processings it is possible to obtain a group of rules for distinguishing the customers who have bought the financial commodity A from the customers who have not bought the same commodity.

As will be seen from the above explanation, the rule group obtained by the foregoing conventional method takes the form of IF . . . ELSE IF . . . ELSE IF . . . like IF the age is 40 or more and the deposit balance is 10,000,000 yen or more, THEN purchase a financial commodity B, ELSE IF the occupation is self-employed AND the annual income is 8,000,000 yen or more, THEN purchase the financial commodity B, ELSE IF . . .

In the case where a computer makes classification by using this rule group, the processings can be executed mechanically merely by checking successively from the head IF. However, the larger the number of rules, the more difficult is it for a human to understand features of the customers who have bought the financial commodity A. A further problem is that as the number of cases increases, the processing time required increases rapidly, because the processing of searching for a rule from the remaining set of cases is repeated at every generation of a rule.

There still exists a serious problem such that in the case of data in the actual world like those in the above example, the data must generally be regarded as containing very large noises. That is, as to whether the financial commodity A is to be purchased or not, the decision to purchase may be influenced by items not contained in the data base, so it is impossible to expect the formation of a highly accurate classification rule. Further, in the case of analyzing the cause of a semiconductor defect referred to above, large noises are contained in the data because the occurrence of a defect is influenced by factors which vary randomly. Also in such a case it is often difficult to request the formation of a definite rule.

Against the above-mentioned problems it is effective to adopt an analyzing method which expresses rough features of data. In the foregoing conventional method, however, the value of many items are combined and a search is made for a rule as accurate in classification as possible, so there generally occurs a phenomenon such that the number of conditions appearing in the IF portion of the rule increases, but the number of cases falling under the rule decreases. Consequently, it is difficult to satisfy the purpose of understanding rough features of data.

In the actual data base are stored a wide variety of information pieces. Those obviously having nothing to do with the purpose of the analysis are also included such as wafer number and manufacturing start year, month, date in the foregoing semiconductor quality control data, as well as name and telephone number in customer data. On the other hand, there also are information pieces which may be effective in the analysis such as product classification code in the semiconductor quality control data and address in the customer data.

In making such analysis as in the above example by using data comprising such many kinds of information pieces, therefore, it is necessary for the user to designate in advance what items of data are to be used to try classification. This work becomes more and more complicated with an increase in the kinds of items. If all of such items that might have any relation are to be included in the analysis, the number of items used increases inevitably, resulting in an increase of the processing time. Then, if the analysis is to be made efficiently, it is required to carefully select items to be used and hence the quality of analysis results obtained greatly depends on the degree of the user's know-how.

In some case, moreover, some particular items require that where the commodity purchasing trend differs between districts in an example of customer data, the question whether the item "address" should be considered at a prefectural level, or at such a level as Tohoku district/Kanto district, or dividedly into two, East Japan/ West Japan, cannot basically encounter a proper answer until analysis is made. If all such cases are to be covered, it is required to repeat the analysis of the conventional method many times, thus causing the problem that the user's burden increases.

To avoid such inconvenience, there has been proposed a method wherein all of the viewpoints at various levels are added as data items. As to address, for example, the items of classification by prefectures/classification by districts/classification by east and west can be considered as data items to be analyzed. In this method of analysis, however, the processing involves a large waste because no consideration is given to the correlation between items in point of meaning.

For example, while classification by prefectures is tried, it is originally not necessary to consider the value of such items as classification by districts and classification by east and west that are at higher levels, but nonetheless the method makes a wasteful analysis. Further, in some particular item processing sequence, a rule which is evidently redundant in its meaning is likely to be created such as "IF address is Kanto district AND address is Kanagawa prefecture THEN . . . ." Where classification by a computer is to be made, such redundancy does not affect the classification accuracy, but it negatively effects the human's understanding of the features of data.

Moreover, in an actual data base there often is contained an unknown data item called a deficit value. When analysis is made by a statistical method or the like, it is inevitably required to merely disregard such deficit value and not to consider it to be data. Also in the foregoing rule induction method, a data item having a deficit value does not affect the classification accuracy so does not appear in the classification rule created.

However, there sometimes is a case where the deficiency itself of a data value is significant. For example, when the item of address is a deficit value and it means the presence of an anonymous account in a bank, this fact may affect the purchase of the financial commodity A. In such a case, the rule "IF address is a deficit value THEN . . ." becomes significant. According to the conventional method it is generally impossible to create such a rule. Besides, there has been a problem that for the formation of such a rule it is necessary to perform a manual processing for converting the deficit value into a specific value explicitly.

According to the conventional method, moreover, since rules are formed with priority given to the classification accuracy, general rules are not always created first in the sense of explaining as many cases as possible. On the other hand, in the data analyzing method being considered, the user may cause an interrupt during processing if the processing time is long. In such a case, if general and simple rules which are highly useful to the user are created first, it becomes possible to utilize the rules which had been created before the time when interrupt was generated. Such a type of utilization cannot be made by the conventional method.

SUMMARY OF THE INVENTION

It is an object of the present invention to solve the above-mentioned problems in a method and system for analyzing data stored in a data base or the like, converting them into an expression useful to users and outputting the thus-converted expression.

It is another abject of the present invention to provide a data analyzing method and system which automatically determines part of a conversion processing method according to the volume and properties of data to be analyzed and which, even in the case of a user not having any special knowledge on the processing method. Thus, the method and system of the present invention can thereby generate results expressing features of the data accurately, execute the above processing at high speed and offer a good operational environment to users in the case of performing the above processing in an interactive computer environment.

According to the present invention there is provided a data analyzing method and system involving grouping of data of numerical or symbolic values as concrete values of plural data items into one record, inputting and analyzing data comprising plural such records, and creating and outputting a rule expressing features of the data. Particularly, the present invention provides a method including the steps of selecting data items for use in an IF clause and a THEN (conclusion) clause of the rule out of the plural data items; when the selected data items have numerical values, converting the numerical values into symbolic values; creating plural candidate rules expressing a correlation between the data items in terms of a rule form comprising one or plural sets of item names and symbolic values; calculating a criterion for evaluating the strength of the correlation expressed by the candidate rules; determining one or plural candidate rules having the largest calculated criterion out of the plural candidate rules created; and outputting the thus-determined candidate rule or rules.

According to the present invention there also is provided a data analyzing method involving grouping data of numerical or symbolic values as concrete values of plural data items into one record, inputting and analyzing data comprising plural such records, and thereby creating and outputting a rule expressing features of the data. The method of the present invention includes the steps of selecting one conclusion item as a data item for use in a THEN (conclusion) clause of the rule out of the plural data items; selecting condition items as data items for use in an if clause of the rule out of the plural data items; when the selected data items have numerical values, converting the numerical values into symbolic values; combining one or plural sets of item names and symbolic values thereof in the condition items to create an if clause, combining an item name and a symbolic value thereof in the conclusion item to create a conclusion clause, and combining the thus-created IF and conclusion clauses to create plural candidate rules; calculating a criterion for evaluating the accuracy of the candidate rules created; determining one or plural candidate rules having the largest calculated criterion out of the plural candidate rules created; and outputting the thus-determined candidate rule or rules as a finally generated rule or rules.

The system of the present invention will now be described concretely. First, means for designating an item to be analyzed ("conclusion item" hereinafter) is provided. For example the item "purchase history of financial commodity B" is a conclusion item and the other items are called condition items.

Next, a check is made to see how many cases are included in data to be analyzed, and in accordance with the number of cases there are determined a maximum number of if clauses contained in each of the resulting rules, a minimum cover ratio of each rule, a cover ratio of a rule group, and the number of rules to be created. The number of IF clauses indicates the number of predicates (e.g. "The percent occurrence of short-circuit of a single-layer aluminum wire is 5% or more.", "The age is 40 or more.") contained in the IF portion of each rule. The cover ratio of a certain rule indicates the ratio of the number of cases which satisfy the IF portion of the rule to the number of all cases. The entire rule cover ratio indicates the ratio of the number of cases which satisfy any IF clause of rules contained in a rule group created to the number of all cases.

Next, with respect to each item contained in data, a check is made to see whether the value thereof has a symbolic attribute or a numerical attribute. For each item having a numerical attribute, there is provided means for dividing the numerical range into plural sections in accordance with a predetermined method and allocating different symbolic values to those sections, respectively, to convert the numerical attribute to a symbolic one. In connection with the number of divided sections there is provided means for selecting within a predetermined numerical range a number corresponding to the closest dependence relation to the conclusion item. In this case, a deficit value is expressed as a predetermined special value.

In each of the above divided sections there is provided a membership function allocating means to diminish the loss in information volume at the time of conversion from numerical value to symbolic value.

As to items having a symbolic attribute, there is provided means for checking the total number of symbolic values which each item can take, and there also is provided processing means which adopts the item as a condition item only when that number is smaller than a preset threshold value and which does not use it in the formation of a rule unless the condition is satisfied.

Further, in connection with a pair of items having symbolic attributes there is provided means which, when the dependence relation between symbolic values has a one-to-many relation, stores the property that the item corresponding to "one" is a senior concept relative to the item corresponding to "many." In the case where data to be used in rule creation is defined from a plurality of relation tables in a data base system such as ROB, the property of senior concept/subconcept between the symbolic attributes can also be obtained by providing an automatic extracting means from a relation definition between element tables".

Also as to the item after conversion from numeric to symbolic attribute by the foregoing means, the property of senior concept/subconcept can be determined by checking the above property.

Next, there is provided means which checks whether a deficit value is present or not with respect to each of the items selected as condition items, then if a deficit value is present, checks according to a statistical technique or the like to see whether the presence of a deficit value will affect the value of the conclusion item, and if the answer is affirmative, converts the deficit value into another predetermined symbolic value indicating the applicability to the condition part of rule.

The results of the above processing are displayed on a display unit, and in this connection there is provided means which permits the user to modify the displayed information as necessary.

In connection with the formation of rules there is provided means which defines a rule criterion determined from both cover ratio and hit ratio, then in the foregoing manner selects a predetermined number of rules from rules having the largest calculated criterion among all of rules having IF clauses in a number not larger than the maximum number of IF clauses and also having a cover ratio not smaller than a predetermined value, and provides the results to an output device. The hit ratio as referred to herein indicates (the number of records satisfying both IF and conclusion clauses of rule)÷(the number of records satisfying the condition clauses of rule). Alternatively, there is provided means which selects candidate rules successively from larger orders in the order of size in criterion and continues the rule selection until the cover ratio as a rule group reaches a predetermined value or larger, to create a rule group.

As to the aforesaid criterion, there also may be provided means which calculates the criterion from the rule cover ratio, hit ratio and the number of IF clauses.

In the case of using membership functions at the time of conversion from numeric to symbolic attribute, there is provided means for calculating the cover ratio and hit ratio using membership values of each case.

In connection with the formation of rules described above there is provided means which creates candidate rules successively from smaller orders in the number of IF clauses and adds new IF clauses to already-created candidate rules to generate new candidate rules. Further, there is provided means for displaying the state of progress of the rule generation processing in accordance with the number of candidate rules created. Also provided are means which permits the user to instruct interruption of the processing, and means which, when the interruption of the processing has been instructed, outputs all or part of the candidate rules which had been created up to that time point, to an output device.

There is provided means for calculating a maximum value of rule criterion which can be taken in the case of adding an IF clause to a certain candidate rule, and also provided is means which judges whether an IF clause is to be added or not in accordance with that maximum value.

In connection with a rule group obtained as an intermediate or final result in the rule generating means, there is provided means which, in order to maximize the rule criterion relating to the entire rule group or one or plural selected rules, changes the shape of the membership functions which were provided in the numeric attribute to symbolic value conversion.

According to the present invention, from a collection of cases to be analyzed it is possible to automatically determine all of parameters used in the data analyzing process, including maximum number of IF clauses, minimum cover ratio of each rule, cover ratio of a rule group, condition items used in the condition part of rule, conversion method from numeric to symbolic attribute, senior concept/subconcept relation between symbolic attributes, and how to handle a deficit value.

Therefore, all that is required for a user who wants to analyze data is to designate a conclusion item to be explained. Then, computer processings follow, and the user can obtain, as results, features of data expressed in a rule form. consequently, it becomes possible to provide a highly accurate data analyzing method which diminishes the time and labor required for the analyzing work and which does not premise the know-how of the user. Of course, by providing means for displaying the above automatically-determined parameters on a display unit and making confirmation and modification if necessary on the user's side, it becomes possible to perform a processing more suitable to the user's data analyzing purpose.

Further, by using, as the criterion for evaluating the accuracy of each rule, a criterion which is determined from the cover ratio, hit ratio and the number of IF clauses, there is created a rule which is more suitable for the user to understand features of data.

In the method using membership functions in the numeric to symbolic attribute conversion, for example even in the cases of values belonging to the same section, distinction can be made in terms of membership function values as to whether they are each near the center or near an end in that section, so it is possible to suppress the loss in information volume caused by symbolization, resulting in that there can be created rules with improved accuracy, expressed in terms of symbolic values and easy to understand.

Moreover, since the generation of candidate rules is done successively from one smaller in the number of IF clauses, even when the processing is not terminated within a predetermined time due to a very large number of cases and of items and has been interrupted according to the user's directions, the rules which had been created up to that time point are very useful in grasping an outline of data features.

In forming candidate rules successively, moreover, by evaluating beforehand a maximum criterion value of rules created with added if clauses, it is possible to avoid the formation of wasteful candidate rules, whereby an efficient processing can be realized. As a result, it is possible to attain the speed-up of processing.

Further, in connection with symbolic values expressed in terms of membership functions contained in a group of (candidate) rules which have been obtained as intermediate or final results, by adjusting the shape of the membership functions so as to give a maximum rule criterion, it is possible to make the meanings of the symbols contained in the rules best explanative of data features. For example, even in the case where a section of "30 to 39" is set for the item of age in the initial processing and financial commodity purchasers have concentrated in the section of 33 to 37 years old for some reason or other, it becomes possible to express that specific section automatically in terms of a membership function. That is, the information that the section shows the existence of a certain characteristic customer segment can be provided to the user.

BRIEF DESCRIPTION OF THE DRAWINGS

The present invention will be more apparent from the following detailed description, when taken in conjunction with the accompanying drawings, in which:

FIG. 1 is a diagram illustrating an example of data to be analyzed in semiconductor failure analysis;

FIG. 2 is a diagram illustrating an example of data to be analyzed in customer analysis;

FIGS. 5A, 5B and 5C are diagrams illustrating examples of data tables;

FIG. 9 is a diagram illustrating a table display screen of a symbolic value conversion method;

FIG. 10 is a diagram illustrating a designation screen for a symbolic value conversion method;

FIG. 15 is a flow diagram of the rule generation processing;

DETAILED DESCRIPTION OF THE PREFERRED EMBODIMENTS

An embodiment of the present invention will be described below with reference to the drawings. This embodiment uses the foregoing analysis example relating to financial commodity purchasing customers.

FIG. 2 shows an example of data to be analyzed, in which a purchasing trend for a certain financial commodity is to be analyzed. In the data of FIG. 2 are included purchase records of a certain financial commodity together with customer number, name, age, sex distinction, address, branch code, prefecture code, district code, deposit balance, loan balance, and the type of credit card.

The user of the data analysis method and system of the present invention analyzes what attributes of customers exert an influence on their purchase of the financial commodity so as to permit the formulation of a strategy (e.g. optimal approach to customers) for marketing to such customers such as direct mail or door-to-door sales.

Figure 3:
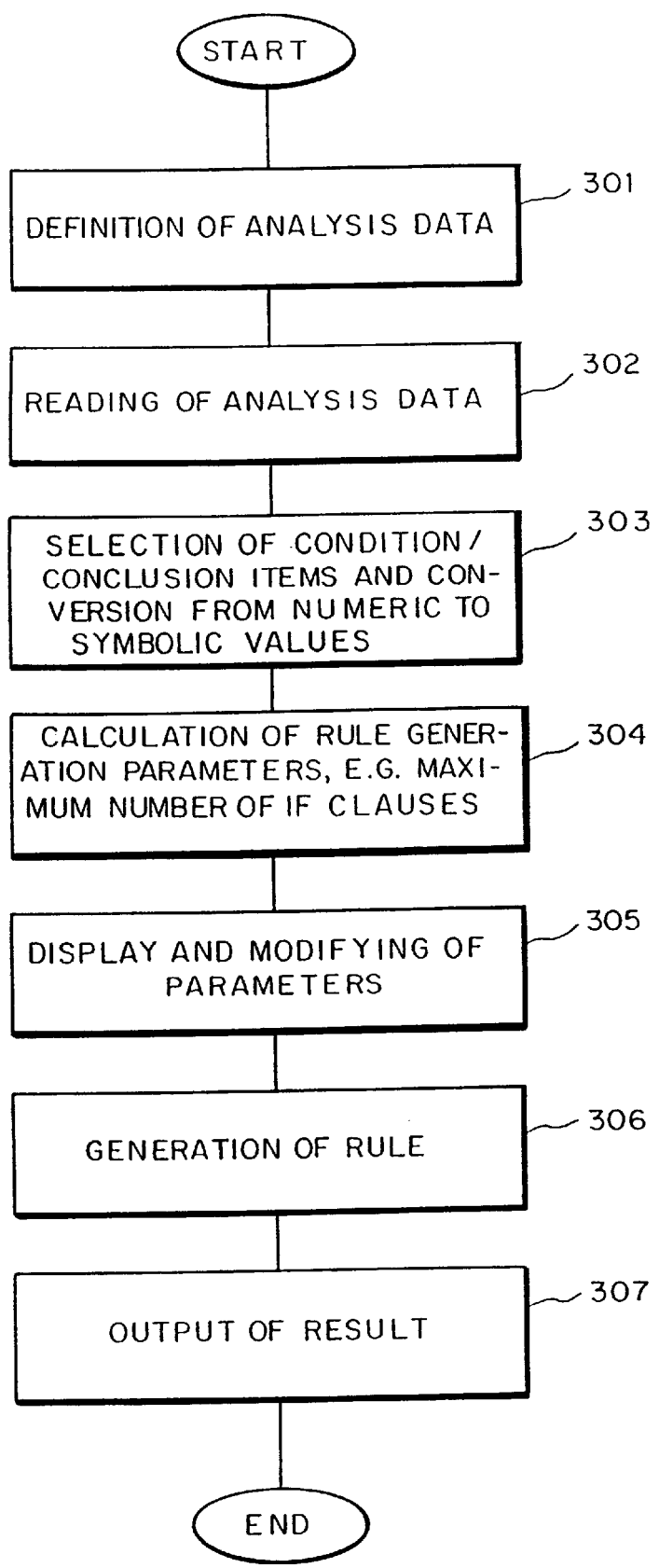
FIG. 3 is a flow diagram of the data analyzing method and system according to an embodiment of the present invention.

FIG. 3 illustrates the overall flow diagram of the analysis method and system of the present invention. First, in process 301, data to be analyzed are defined and a table of data to be analyzed as illustrated in FIG. 2 is prepared. Next, in process 302, the data to be analyzed are read.

In process 303, first the item "Purchase Commodity" is designated to be a THEN (conclusion) item. Next, each item of the data is checked to see whether the item has a symbolic attribute or a numeric attribute. With respect to each item, whether it is to be selected as a IF (condition) item or not is judged, and in the case where a selected item has a numeric attribute, there is made conversion of the numeric attribute to a symbolic value. Finally there is produced data as an input to the rule generation processing.

In process 304, parameters (maximum number of IF clauses, minimum cover ratio, etc.) in the rule generation processing are determined on the basis of information such as the number of cases. In process 305, the thus-determined parameters are displayed on a display unit and, if necessary, the user modifies the parameters. In process 306, the rule generation processing is executed, and in process 307 the result is outputted to an output device.

Although a rule learning processing is omitted in FIG. 3, the same processing may be executed after process 307 as necessary under the user's directions.

Figure 4:
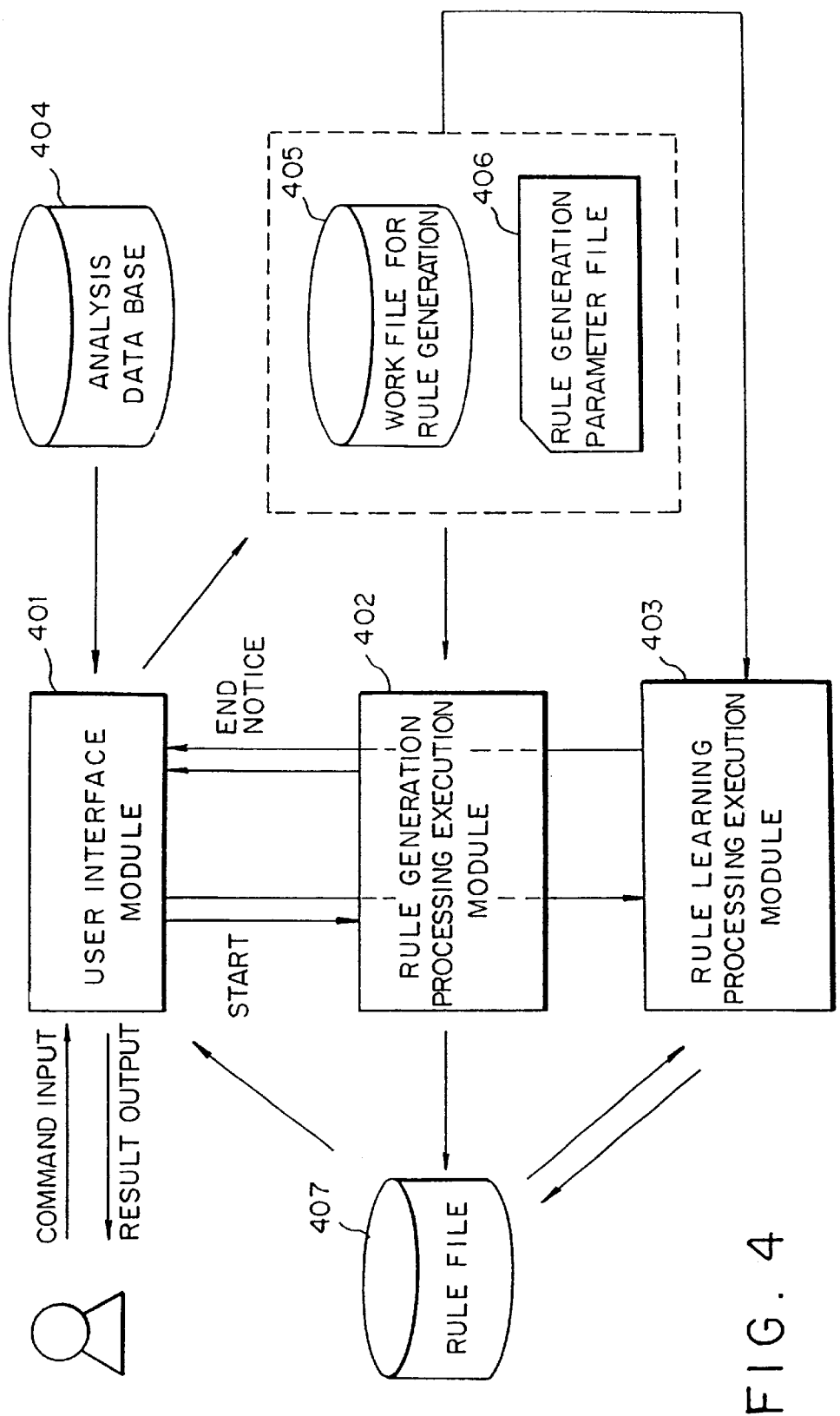
FIG. 4 is an entire block diagram of a data analyzing system.

FIG. 4 is a block diagram of a system for executing the above processings. The system roughly comprises three processing modules, which are user interface module 401 for controlling interaction with the user, a rule generation processing execution module 402 for generating rules from the data to be analyzed, and a rule learning processing execution module 403 for making fine adjustment of each rule created by learning of membership functions.

The module 401 recognizes user's directions as a command, then inputs data from a to-be-analyzed data base 404 in accordance with the command, generates a rule generating work file 405 to be inputted to the rule generation processing execution module 402, and at the same time outputs parameters for controlling the rule generation processing to a rule generation parameter file 406. Upon input of a rule generation execution command from the user to the module 401, the module 401 starts up the module 402.

Upon start-up, the module 402 reads information from the files 405 and 406, then executes the rule generation processing for the data of the file 405, by using parameters designated by the file 406, and outputs the result to a rule file 407. In the rule file 407 are stored both information of generated rules and information of membership functions which define predicates included in the generated rules.

When the execution of module 402 is over, control returns to module 401, and the resulting rule is displayed in a predetermined form to the user. On the basis of the displayed result the user can continue operation such as, for example, modifying parameters and re-executing the above processing.

If a learning command for the rules created is inputted to the module 401, the module 401 starts up the module 403. Upon start-ups the module 403 reads the contents of the data base 404 and rule file 407 and executes learning of membership functions with respect to each of the rules contained in the rule file 407. Thereafter, the information of the learned membership functions is stored in the rule file 407 and the control is returned to module 401.

Of the processes shown in FIG. 3, the process 306 is executed by module 402 and the other processes executed by module 401.

The details of each process will be described below successively in accordance with the flow shown in FIG. 3.

Figure 6:
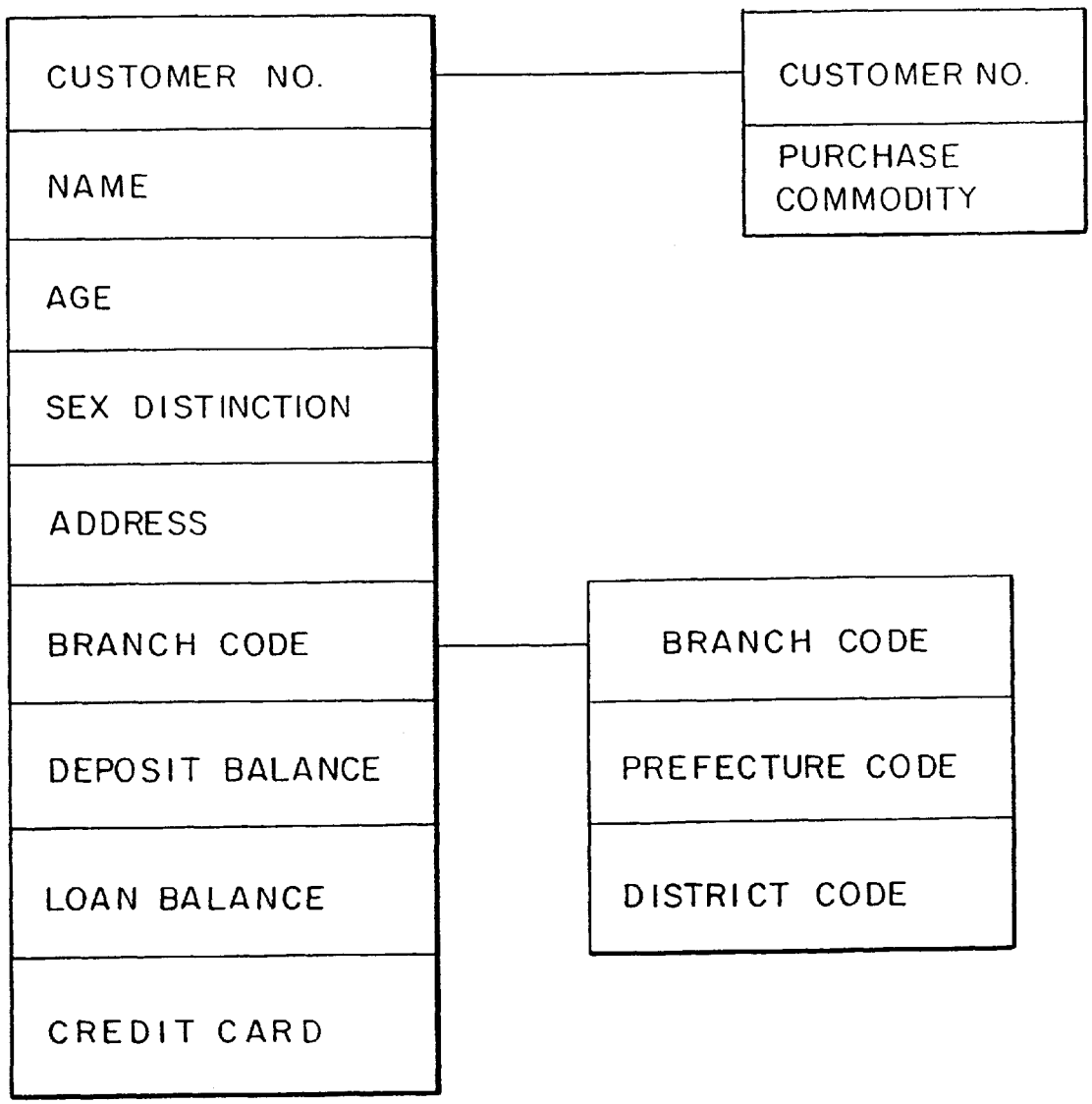
FIG. 6 is a diagram illustrating an example of relation definition between plural data tables.

FIGS. 5A–5C and 6 are diagrams explaining the contents of to-be-analyzed data defining processing which is executed in process 301. The data to be analyzed are stored in a plurality of relation tables, which are a customer information table of FIG. 5A, a branch information table of FIG. 5B and a commodity purchase history table of FIG. 5C. FIG. 6 is a diagram which designates a correlation among the three tables shown in FIGS. 5A–5C and which schematically illustrate the table structure definitions of FIG. 2 to be analyzed. These definitions can be made by using functions provided by a relational data base management system (RDBMS).

In the process 302 shown in FIG. 3, the to-be-analyzed data shown in FIG. 2 are read from the data base and are expanded in memory within the computer. At the time of reading data, judgment is made as to whether the value of each item is numeric or symbolic, and in the case of a numerical value, maximum and minimum values are determined while in the case of a symbolic value, the number of different symbols is determined for each item.

Figure 7:
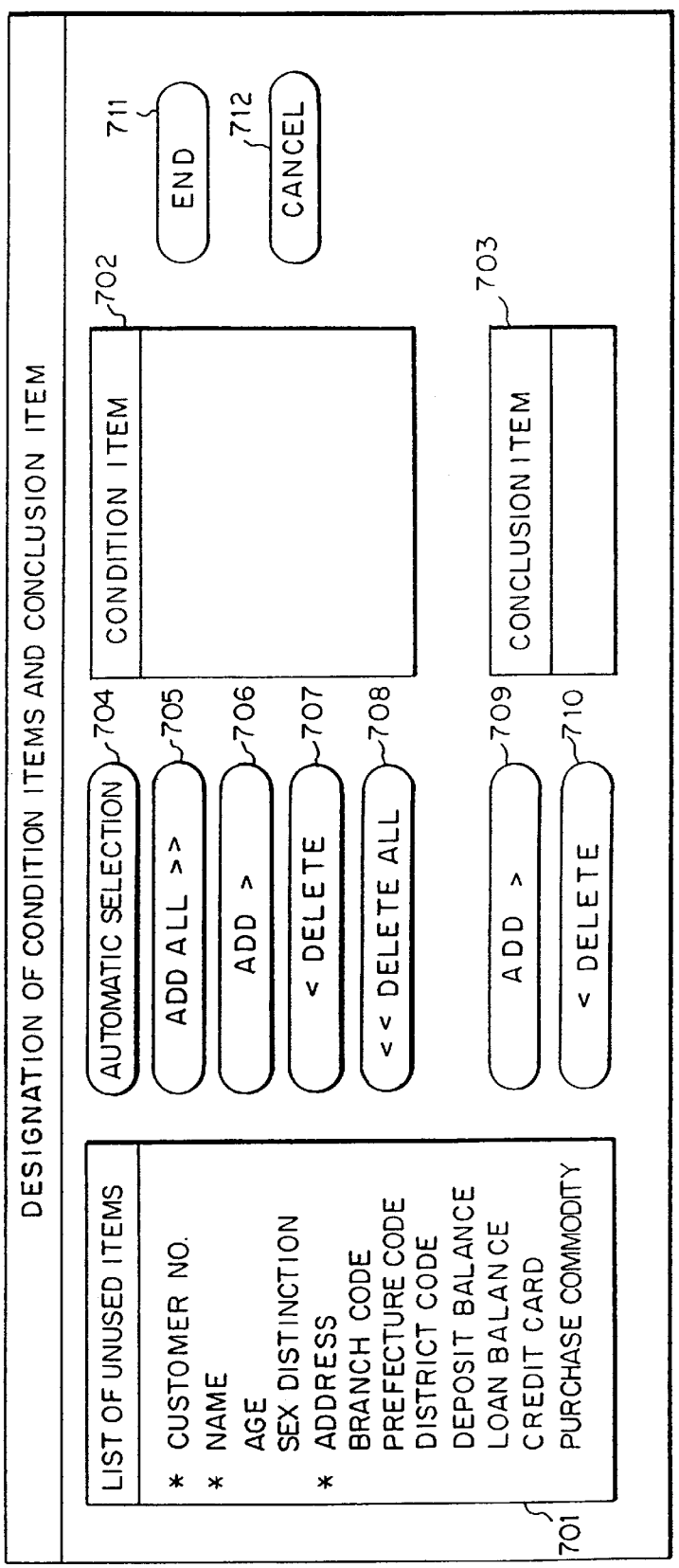
FIG. 7 is a diagram illustrating an item designation screen in a rule generation processing.

FIG. 7 illustrates a screen relating to the designation of condition and conclusion items in process 303 in FIG. 3. In process 303, there is made such a screen display as FIG. 7 and the user is allowed to designate condition and conclusion items.

Just after reading data, no item is selected, the item names of the data to be analyzed shown in FIG. 2 are displayed in an unused item name list box 701, and the contents of a condition item name list box 702 and that of a conclusion item name text box 703 are empty.

In connection with the display in the list box 701, when among the attributes of symbolic values determined by process 302 the number of different symbols is a predetermined number or more, e.g. 20 or more, the selection as a condition or conclusion item is rendered impossible and a display is made to the effect that the item name concerned is unselectable. This is for preventing the resulting rule from being subdivided and deteriorated in its utility value which would occur in the case of designating as a condition or conclusion item an item whose number of symbolic values is larger than the number of case. For example, customer number, name and address in FIG. 7 correspond to such items. In FIG. 7, the "*" mark is prefixed to the heads of items, indicating that those items are unselectable. Of course, the same effect can be attained also by using half-tone dot meshing display or light color display. By so doing it is made possible to prevent the use of items whose use in the rule generation is meaningless.

By selecting a plurality of (selectable) items from the list box 701, by using an input device such a mouse or the like, and by clicking a button 706, the items for selection are selected as condition items, their names are deleted from the list box 701 and added to and displayed in the list box 702. Likewise, by selecting one item from the list box 701 and clicking a button 709, a conclusion item is selected. Also at the time of deleting items from the list boxes 702 and 703, deletion items are selected, followed by clicking of buttons 707 and 710.

By clicking a button 705 it is made possible to add all the items other than unselectable items displayed in the list box 701 to condition items. Conversely, a button 708 is for deleting all the items in the list box 702 from the condition items.

The condition/conclusion item selecting processing is terminated by clicking a button 711 after completion of the above selections. on the other hand, if a button 712 is clicked, all the item selecting information pieces so far obtained are discarded.

The following description is now provided about an automatic condition item selection processing which is executed upon clicking of a button 704. Since this processing can be executed only when a conclusion item has been designated, it follows that the button 704 is effective only when a conclusion item has been designated.

Figure 8:
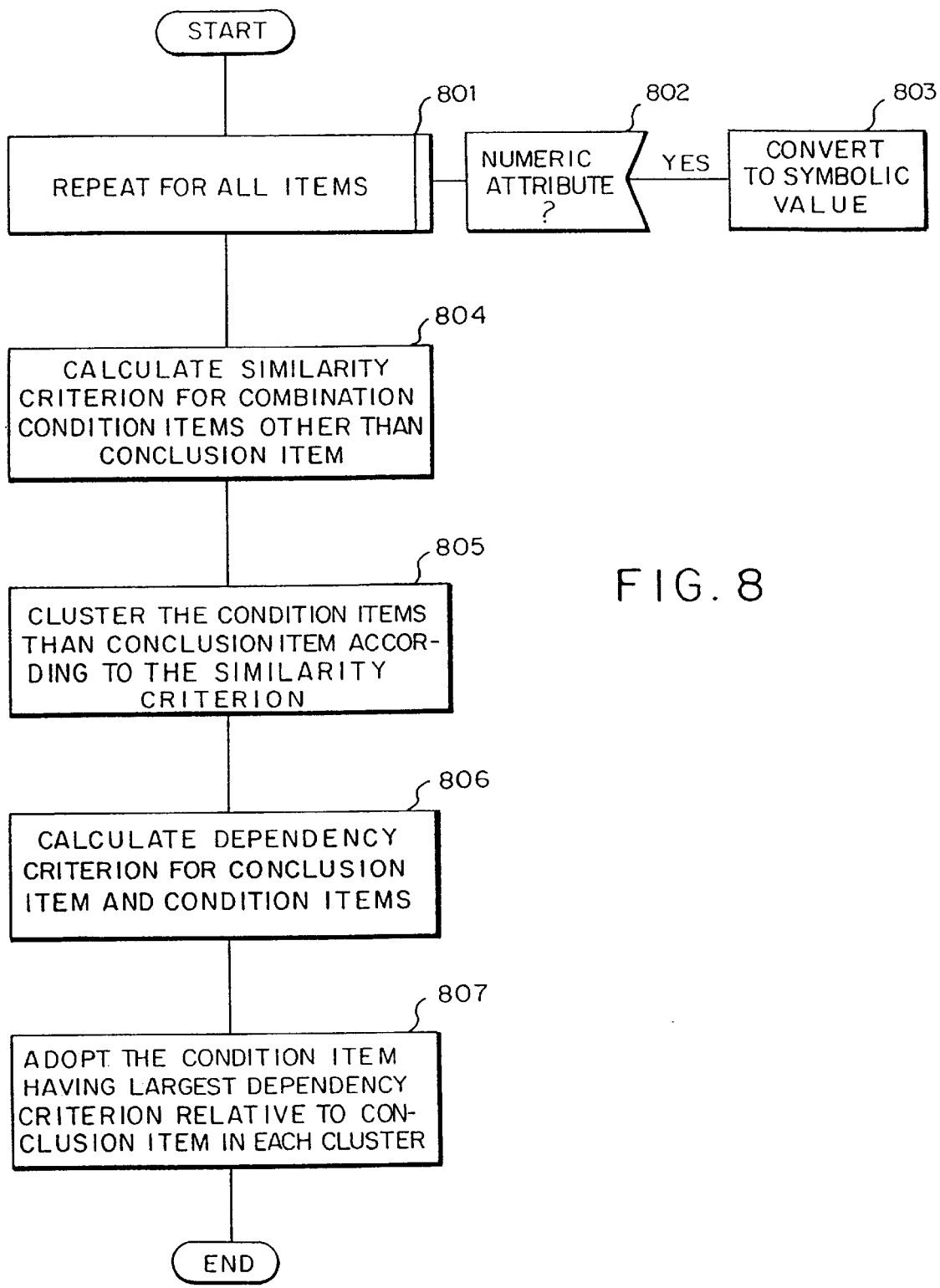
FIG. 8 is a flow diagram of an automatic item selection processing.

FIG. 8 shows a flow diagram of the automatic condition item selection processing. By clicking the button 704 after designating a conclusion item (text box 703) in FIG. 7, the execution of the processing shown in FIG. 8 is started.

In process 801, there are repeated processes 802 and 803 with respect to all the items except those which are unselectable. In process 802, a check is made to see if the item being processed has a numeric attribute or a symbolic attribute. If it has a numeric attribute, the process 803 is executed.

In process 803, the value of the item being processed is converted into a predetermined number, say five, of symbolic values. In the example of the item "age" in FIG. 2, the value range which the item value can take is divided into, for example, five ranges of "less than 20," "not less than 20 to less than 30," "not less than 30 to less than 40," "not less than 40 to less than 50" and "not less than 50." Thus, classification is made into five categories. Various methods are available for this classification, including the following three methods for example.

1) Equal Range Division: The range of values capable of being taken is divided equally. For example, if the minimum value of age is 0 and the maximum value thereof is 75, classification is made into 0~14, 15~29, 30~44, 45~59 and 60~75.

2) Average/Standard Deviation Division: An age value distribution average and a standard deviation are determined and then division is made on the basis of the values obtained. For example, if the average is $\mu$ and the standard deviation is $\sigma$, the values of $\mu-0.84\sigma$, $\mu-0.25\sigma$, $\mu+0.25\sigma$ and $\mu+0.84\sigma$ are used as division points. These are values which make equal the probability of being included in each range, assuming that the distribution is a normal distribution.

3) Equal Number Division: Actual age value distribution is checked and classification is made so that the classified ranges are equal in the number of cases included therein.

As to which method is to be used for classification, a default method is provided in advance, and there is provided means which permits the user to make designation as necessary.

The numerical data thus classified in the above manner are converted to symbolic value data having, say, values of "category 1", "category 2"~"category 5".

In process 804, with respect to all combinations each composed of a set of two arbitrary items included in the items other than the item which has been designated a conclusion item, all similarly criteria between the two items is calculated in the following manner.

First, the two items are assumed to be X and Y, and the values which they can take are assumed to be xi (i=1, Nx) and yj (j=1, Ny). It is optional whether X and Y are to be items originally having symbolic values or items after conversion from numeric to symbolic values in the above manner. If X and Y are considered to be probability variables, there is defined a mutual information volume therebetween.

As to the mutual information, it is explained in many textbooks of information theory. The mutual information volume means an amount relating to how the information of a Y value generating probability distribution changes when information X=xi is given for example. It is an amount which represents the degree of correlation between X and Y. The mutual information I (X; Y) is defined as follows:

$$I(X;Y) = \Sigma i \Sigma j$$

$$P(xi,yj)\log[P(xi,yj)/P(xi)P(yj)] \quad (1)$$

In the above equation, $\Sigma$ represents a sum relating to the subscript i, P(xi) represents the probability of X=xi, and P(xi, yj) represents the probability of X=xi and Y=j. It is here assumed that the probabilities are each calculated from the appearance frequency of records contained in the data. For example, P(xi) is assumed equal to N(xi)/N where N is the number of all records and N(xi) is the number of records corresponding to X=xi.

Since there is the property of I (X; Y)$\geq$0, it can be regarded that the larger the value of I(X; Y), the closer is there a relation between X and Y. In the extreme case where X and Y are completely each independent, P(xi, yj)=P(xi)P(yj) and I(X; Y)=0.

From the above property it is possible to define a similarity criterion D (X; Y) between the items X and Y in terms of the following equation:

$$D(X; Y) = 1/I(X; Y) \quad (2)$$

In connection with the above equation it is promised that when I(X; Y)=0, the value of D takes a very large fixed value.

In process 805, the condition items other than the conclusion item are subjected to clustering on the basis of the similarity criteria D which have been calculated in process 804 for each combination of items covering all the other items than the conclusion item. More specifically, D(X; Y) is regarded as the distance of items X and Y, then on the basis of item-to-item distances of all the items, closer items in the distance are arranged and classified in the units of cluster.

In connection with the method of clustering, there are known various algorithms. The details thereof are described in general textbooks and literatures relating to statistics, so will not be explained here. For example, by using a method called k-means method, items high in similarity (degree of correlation) with one another, out of candidates of condition items, can be arranged into one cluster.

In many algorithms the number of clusters is designated in advance, but here one tenth of the number of all data items is assumed to be the number of clusters as default value. That is, in the case where the number of items in the data to be analyzed of FIG. 2 is 62, there are generated 62÷10=6 (omission of fractions) clusters. Of course, there is provided means which permits the user to designate the number of clusters directly as necessary.

In process 806 there are calculated dependency criteria with respect to combinations of the conclusion item and the other items. For this calculation there may be used, for example, the mutual information volume I(X; Y) which has been explained in connection with process 804.

In process 807, with respect to the clusters classified in process 805, items which are the largest in the dependency criterion relative to the conclusion item among the items belonging to the clusters, are selected and adopted as condition items.

By the processing of FIG. 8 it becomes possible to automatically select condition items which are the highest in the correlation (dependency) with the conclusion item and kept as low as possible (high in independency) in the correlation between themselves, from mixed data of items having numeric and symbolic values. As result, there can be created highly accurate rules through processes which follow, and since analogous condition items are not used, it is possible to make the rules more independent of one another, whereby the legibility and usefulness of the generated rules can be enhanced.

In process 303, a deficit value countermeasure processing is executed for the items which have been selected as condition items in the above processing. In the deficit value countermeasure processing, the following steps are carried out for each of the items selected as condition items.

Step 1: A check is made to see if a deficit value data is included in each of the items being selected. It is here assumed that the deficit value data is expressed in terms of a special numerical value (e.g. a negative maximum value) or a symbolic value (e.g. an empty character string). If no deficit value is included, the processing is terminated.

Step 2: A mutual information volume I(X; Z) for a conclusion item Z is determined when classification is made as to whether the value of each item being selected is a deficit value or not, X being a probability variable having a value of whether the value of the item being selected is a deficit value or not.

Step 3: If the mutual information volume I(X; Z) obtained in step 2 is larger than a preset threshold value Ith, it follows that the deficit/non-deficit determination and the conclusion item are correlated with each other to a higher extent than a predetermined level. A deficit value of the item being selected is added as a new symbolic value.

Through the above processing, if it is judged in step 3 that significance exists in being a deficit value itself, the special symbolic value, "deficit value", is added to the item concerned and it becomes possible to use that symbolic value in the generation of rule as will be described later. In other cases, the deficit value of that item is treated as a special value which is completely ignored (not belonging to any symbolic value and never appearing in the resulting rule) in the rule generation processing which will be described later.

The numeric to symbolic value conversion processing in process 303 in FIG. 3 is performed in the following manner.

FIG. 9 is a table display of the numeric to symbolic value conversion method. The user designates a conversion method with respect to each item, by using a mouse or the like and with reference to such a display as FIG. 9 which is of a display field.

In FIG. 9, in an item name display field 901 are displayed the names of items which originally have numerical attributes and which are converted to symbolic values. In a symbol number display field 902 is displayed the number of different symbols after the conversion to symbolic values, and in a symbol name display field 903 are displayed the names of symbolic values.

In the example of FIG. 9, different symbolic values are allocated like "the age is less than 20, in his (or her) twenties, . . . , the deposit balance is small, ordinarily, much, the loan balance is small, medium, . . ." In a conversion method display field 904 is displayed the numeric to symbolic value conversion method explained in process 803 of FIG. 8. In the example of FIG. 9, the conversion method for age is "designation by user," which indicates that the user has directly designated a method for division.

After the designation of a symbolic value conversion method for each item is over, the conversion method designating processing is terminated by clicking a button 906, and the contents of the designations so far made are discarded by clicking a button 907. Further, by clicking a button 905, the conversion method for all the items is reset by the symbolic value conversion method using a defaults as has been explained also in connection with process 803 in FIG. 8.

The designation of a conversion method for each item is effected by double-clicking the item name portion of the field 901. By so doing, a conversion method designating screen of FIG. 10 is displayed and it becomes possible to designate a conversion method for the item concerned.

In FIG. 10, an option button 1001 designates which of equal number division, equal range division, average/standard deviation division, and user designation division, is to be used as a symbolic value conversion method for each item being selected, and also designates whether each dividing method is to be carried out crisp wise (discrete values) or fuzzywise.

To a text box 1002 is inputted the number of symbols in the conversion to symbolic values. In a symbol name display field 1003 are displayed the present symbol names. Where a symbol name is to be changed, a desired symbol name can be inputted by clicking the area concerned of the field 1003. This is also true of a minimum value display field 1004 and a maximum value display field 1005 with respect to each item value, provided when the user has directly changed the minimum or maximum value, the option button 1001 turns automatically to the state of user designated division.

Upon change of the values in the field 1004 or 1005, the contents of a record number display field 1006 are also changed accordingly in an automatic manner. This is done by using data stored in memory and counting the number of records corresponding to each symbolic value.

In connection with the option button 1001, by designating either crisp division or fuzzy division it is made possible to designate whether the symbolic value conversion processing is to be performed crisp wise or fuzzy wise within the minimum value/maximum value ranges displayed in the fields 1004 and 1005, respectively. By performing the processing fuzzywise, the information volume lost by the symbolic value conversion can be kept to a minimum and it is possible to improve the accuracy of each rule created. Reference will be made below to this processing.

Figure 11:
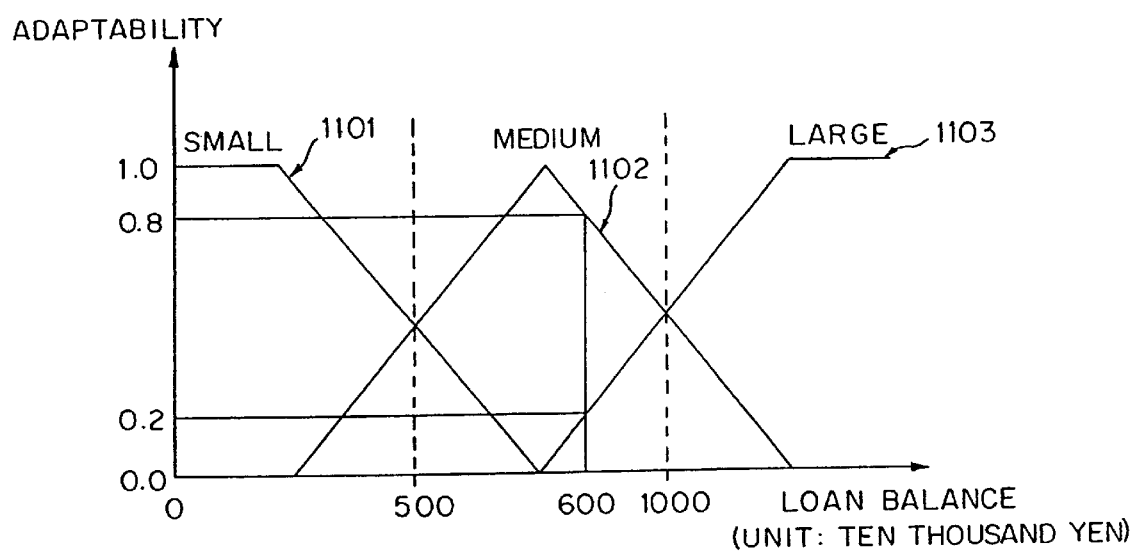
FIG. 11 is a diagram illustrating an example of the shape of membership function.

Also in making the division fuzzy wise, the ranges of each symbolic value are displayed as minimum value and maximum value in the fields 1004 and 1005, respectively, in FIG. 10, which are interpreted as fuzzy. FIG. 11 explains such a fuzzy division in terms of the loan balance symbolic value conversion method shown in FIG. 10.

In FIG. 11, the axis of abscissa represents numerical values of loan balance in the unit of ten thousand yen, while the axis of ordinate represents adaptability of (fuzzy) symbolic values which are "small," "medium" and "large." Membership functions 1101, 1102 and 1103 correspond to the symbolic values "small," "medium" and "large," respectively. The shape of the membership functions can be set in such a manner that the absolute value of slope is constant, the respective membership function values become 0.5 at division points of symbolic values (two division point in the drawing which are 500 as a division point between "small" and "medium" and 1000 as a division point between "medium" and "large"), the number of membership functions having a value other than 0 for any value is two at most, and the sum of membership function values becomes 1.0.

For example, the numerical value "loan balance=600 (unit: ten thousand)" comes to have a value of 0.8 for the symbolic value "medium" and a membership value of 0.2 for the symbolic value "large". That is, it can be regarded that the record having the value of "loan balance=600" behaves as if it were divided in two records, one of which is 0.8 record of "medium" and the other 0.2 record of "large".

In such a fuzzy division, the number of records displayed in the field 1006 in FIG. 10 can be considered to be the total of membership values, which total generally takes a value of a real number.

Next, in connection with the process 304 in FIG. 3, description will be directed below to a rule generation parameter calculating processing. The following five kinds of parameters are considered as parameters for controlling the rule generation processing:

the number of rules created entire cover ratio
maximum number of IF clauses minimum cover ratio
cover ratio priority coefficient The number of rules created is a parameter which designates the number of rules to be created in the rule generation processing. A default value is determined from the number of condition items used, N, in accordance with the following relationship:

(Default value of the number of rules created)=N*(maximum number of IF clauses)

This reflects the fact that in general, the larger the number of condition items, the larger the number of rules to be created for explaining features of data.

The cover ratio is defined to be the ratio of the number of cases satisfying the condition part of a certain rule to the number of all cases. The entire cover ratio is a parameter which, with respect to created rules, designates the ratio of the number of cases satisfying the condition part of at least one rule to the number of all cases. There is a relation such that the entire cover ratio becomes higher with increase in the number of rules created. For the entire cover ratio there is not provided a default value (in other words, a value can be set only by an explicit designation made by the user).

The maximum number of IF clauses is a parameter which designates a maximum number of predicates contained in the condition part of a rule. For example, when the maximum number of IF clauses is set to 3, the following rule can be created:

IF X1 is A1 AND X2 is A2 AND X3 is A3 THEN Z is B.

However, it follows that the rule "IF . . . , . . . , . . . and X4 is A4 THEN . . ." is not generated (because the number of IF clauses is 4). A default value is set at 3.

The minimum cover ratio is a parameter which designates a minimum cover ratio of a rule created. A rule having a cover ratio smaller than the designated value is regarded as a special rule and is not generated. A default value of the minimum cover ratio is set at 100/(the number of rules created) (unit: percent). This takes into account that generally even minute rules are needed with an increase in the number of rules created.

The cover ratio priority coefficient designates a relation between a cover ratio and accuracy in the criterion for rule. The details thereof will be described later in connection with the rule generation processing. A default value is set at 1.0 (with top priority given to the cover ratio).

Figure 12:
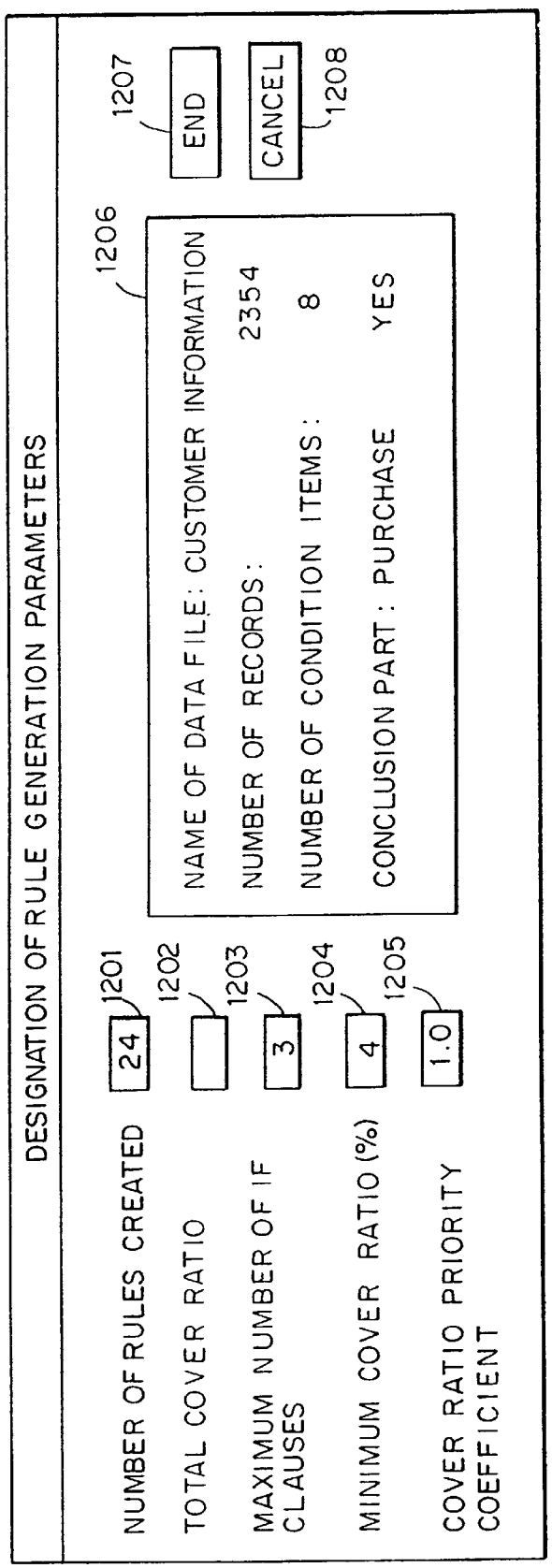
FIG. 12 is a diagram illustrating a designation screen for rule generation parameters.

In process 305 shown in FIG. 3, the rule generation parameters calculated in process 304 are displayed on a display unit in such a manner that the user can modify them where required. FIG. 12 shows an example of a display screen.

In text boxes 1201 to 1205 are displayed the rule generation parameter values calculated in process 304 in FIG. 3. In the illustrated example, the number of rules created=24, entire cover ratio=not specified, maximum number of IF clauses=3, minimum cover ratio=4%, cover ratio priority coefficient=1.0.

The user can input the displayed parameter values by clicking the text boxes directly. On the display screen of FIG. 12, other information pieces (name of data file, the number of records, the number of condition items, conclusion item and its symbolic value) of the data to be analyzed are displayed in a display area 1206, so it becomes possible for the user to modify the rule generation parameter values while referring to those information pieces.

By clicking a button 1207 after such modification of the parameter values, the modified values become effective, while upon clicking of a button 1208, the modified values are discarded.

In process 306 shown in FIG. 3, the rule generation processing is executed in accordance with the rule generation parameters which have been designated in processes 304 and 305.

In the rule generation processing there is created a rule of the following form:

IF X1 is A1 AND X2 is A2 AND . . . AND Xn is An THEN Y is B.

Where, X1 is a condition items identifier, A1 is a symbolic value identifier of item X1, Y is a conclusion item identifier, and B is a symbolic value identifier of item Y.

A set of "X1 is A1" is called an IF clause. The above rule is an example of rule having n number of IF clauses. The whole of IF clauses is called a condition part. "Y is B" is called a conclusion clause. In this embodiment it is assumed that a conclusion part is constituted by one conclusion clause.

To each rule is allocated a real number value called criterion. It is regarded that the larger the criterion of a rule, the higher the rule value.

In process 306 shown in FIG. 3 there is executed a processing of selecting a rule having the largest calculated rule criterion from among condition and conclusion clause combinations. By this processing it is made possible to select a rule of high value.

In this embodiment, the criterion $\mu(A \rightarrow B)$ of the rule "IF A is B" is defined as follows:

$$\mu(A \rightarrow B) = P(A)^{\beta} * \log[P(B|A)/P(B)] \quad (3)$$

Where, $a^b$ means the bth power of a; $P(A)$ represents the probability of condition part A being satisfied in the data to be analyzed, namely the proportion of cases which satisfy the condition A among all cases; $P(B)$ represents the probability of conclusion part B being satisfied; $P(B|A)$ represents the probability of conclusion part B being satisfied on the premise that the condition A is met; and $\beta$ denotes the cover ratio priority coefficient which has been explained in connection with process 304 in FIG. 3. If the equation (3) is rewritten in terms of the number of cases, the result is P(B|A)=P(A & B)/P(A), so:

$$\mu(A \to B)=[N(A)/N]^\beta * \log[N \cdot N(A\&B)/N(A)N(B)] \quad (4)$$

Where,

N: the number of all cases

N(A): the number of cases satisfying condition part A

N(B): the number of cases satisfying conclusion part B

N(A&B): the number of cases satisfying both condition part A and conclusion part B The first factor in the definition of equation (4) is the Bth power of the cover ratio, while the second factor corresponds to accuracy. The higher the cover ratio (the wider the range of cases explained) and the higher the accuracy (the higher the probability of the entire rule being established), the higher the criterion. In general, the wider the range covered, the lower the accuracy, so those two factors tend to run counter to each other. The cover ratio priority coefficient β, one of the rule generation parameters, is for determining to what extent importance is to be attached to the cover ratio in connection with the criterion. When β=1.0, top priority is given to the cover ratio, while when β=0.0, the evaluation of rule is made in consideration of only accuracy without considering the cover ratio.

Of course, the rule criterion defined here is one candidate and it is possible to add the definition of several criteria or use those definitions in an alternately switching manner as user option.

In the rule generation processing, a designated number of rules are generated out of rules large in the rule criterion defined by equation (4). The space to be searched includes a combination of all possible if clauses.

Even in the case where the number of condition items is 10 and that of symbols in each of them is 3 or so, the search space is enormously wide (of the order of 10 power of 30) and therefore it is impossible to perform the total number search within a realistic time. In view of this point, the search is rendered efficient by restricting the search range and by disbranching in accordance with a method to be described.

First, the rule searching range can be restricted by using the maximum number of IF clauses and minimum cover ratio.

As the search method in the space after such restriction, a depth preference search method is used in this method.

Figure 13:
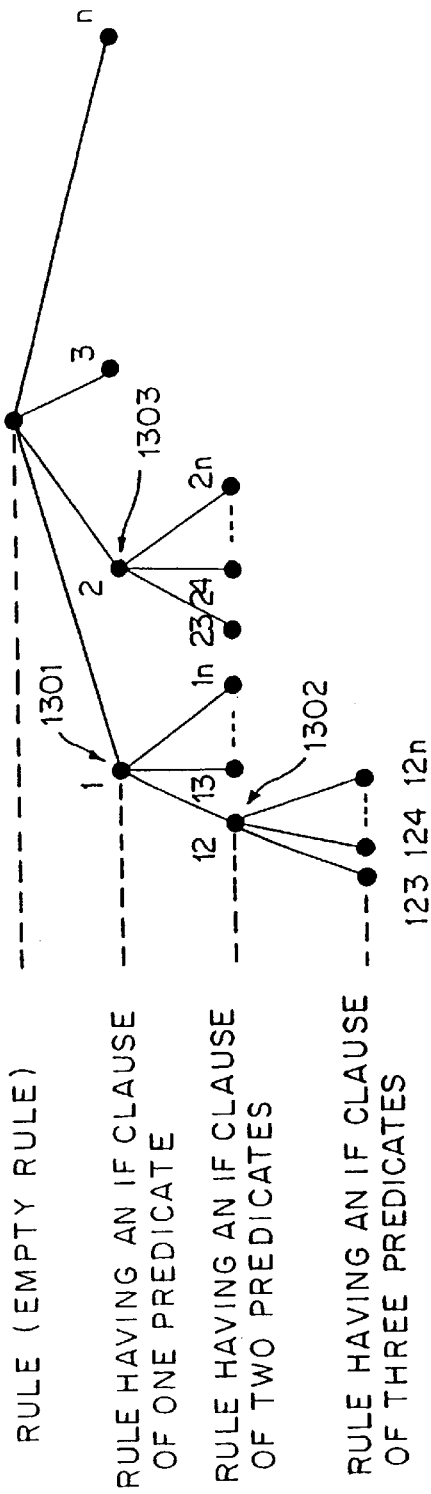
FIG. 13 is a diagram explaining a rule searching method.

FIG. 13 illustrates an image of the search space. Since the search space is basically a combination of IF clause predicates, the tree structure search technique is applicable.

For example, in FIG. 13, the rule corresponding to node 1301 is "If X1 is A then . . . ," and the rule corresponding to node 1302 is "If X1 is A and X2 is B then . . . ." That is, the IF clause of the rule corresponding to a child node includes the IF clause of the rule corresponding to a parent node plus one predicate. The numerical value affixed near each node indicates a predicate in the IF clause of the rule corresponding to that node. For example, the numerical value {1} appearing near node 1301 represents the predicate "X1 is A" in the corresponding rule. Further, {12} which appears near node 1302 represents the predicates "X1 is A and X2 is B" in the corresponding rule.

In FIG. 13, the maximum number of IF clause predicates is 3. The height of the tree (the maximum number of links from the root up to the terminal node) corresponds to the maximum number of IF clause predicates.

In what order predicates appear in an IF clause has no meaning, so it is to be noted that, for example, child nodes of the node 1303 begin with {23}, not {21}. It is also to be noted that two predicates having different symbolic values despite the same condition item are not included in one IF clause. This condition should be taken into account when a child node is to be generated by adding one predicate to an IF clause of a parent node.

According to the depth preference search method, all the nodes shown in FIG. 13 are created in the following sequence and evaluated:

1→12→123→124→. . . →12n→13→134→135→. . . →(n-2)(n-1)n→(n-1)→(n-1)n→n

In the case of depth preference search, it suffices to check candidate rules in the above sequence while maintaining N number (N is the number of rules created) of rules so far largest in the criterion.

Description is now directed to a disbranching method which is for attaining speed-up of the rule search mentioned above. The number of nodes in FIG. 13 is about the third power of 30 in the foregoing example, so it is not impossible to make a total number search directly, but it is necessary to adopt as efficient a search method as possible because the number of items sometimes reaches 100 or so in the case where several hundred thousand to several million data are to be analyzed.

The basic way of thinking for the improvement of efficiency is "disbranching". According to this way of thinking, by evaluating the state at a certain intermediate note, the evaluation of child nodes thereof is omitted. In the case of the rule generation processing in this embodiment there are performed disbranching using the cover ratio and that using the rule criterion.

The basic way of thinking of the disbranching method using the cover ratio is that when a rule corresponding to a certain node has been generated and when the cover ratio of that rule is lower than the lower limit of cover ratio designated by the user, it is not necessary to search that node and all of its child nodes. The IF clause of the rule corresponding to a child node includes the if clause of the rule corresponding to the parent node plus one predicate, so it follows that when the cover ratio of the rule corresponding to the parent node has become lower than its lower limit, the cover ratio of the rule corresponding to the child node is also sure to become lower than the lower limit.

Reference will now be made to the disbranching method using the rule criterion. In the case where N number of rules are to be created in the search, the criterion of the Nth candidate rule at a certain time point of the search is assumed to be $\mu$th. According to the basic way of thinking of disbranching, a maximum value of rule criterion at a partial tree which is rooted at a certain node is determined, and when the value thus determined is smaller than $\mu$th, there is not generated a partial tree node. In this case, how the maximum criterion value of the node included in the partial tree is to be estimated is an important factor in determining the disbranching efficiency.

This evaluation method will be described below. In the following description, for ease of explanation, the cover ratio priority coefficient β is set at 1.0. Since extension in the cases of general values can be done easily, explanation thereof will be omitted here.

If the rule at a certain node is "If A is B", its criterion is defined as follows:

$$\mu(A \to B)=[N(A)/N]*\log[(N \cdot N(A\&B)/N(A)N(B)] \quad (5)$$

If an if clause including the if clause A plus predicates is A', the maximum value of $\mu(A' \to B)$ is limited to the case where N(A')=N(A&Bi). This is because N and N(B) in the above equation may be regarded as constants and N(A&B) may also be regarded as constants since the above equation exhibits a monotonous increase with respect to N(A&B) (that is, a rule which forces down the accuracy never maximizes the criterion). Therefore, the equation (5) may be written as follows:

$$\mu(A' \to B) = [N(A')/N] * \log[N \cdot N(A'\&B)/N(A')N(B)] \quad (5)$$

In connection with this equation, a maximum value may be determined in the range of $N(A\&B) \leq N(A') \leq N(A)$. Differentiation of the above equation with N(A') is sure to give a value of smaller than 0, so a maximum value of $\mu\max = [N(A\&B)/N] * \log[N/N(B)]$ is obtained when $N(A') = N(A\&Bi)$. If this value is smaller than $\mu$th, it is not necessary to search descendant nodes of the node in question.

In the actual search, finding out a rule high in criterion in an early stage is effective in point of efficiency improvement. The earlier the finding, the larger the value of $\mu$th and the greater the possibility of execution of disbranching.

According to one strategy for attaining such a way of search, first a check is made for all the cases where the number of if clause predicate is 1, and the case where the number of if clause predicate is equal to or larger than 2 can be subjected to the depth preference search. That is, if β is larger than 0, the higher the cover ratio, the larger the criterion of the rule concerned, and the value of $\mu$th can be made large by first checking the case where the number of IF clause predicate is 1.

By conducting the search in the above manner, not only there can be attained speed-up of the rule generation processing but also there is obtained an effect such that when the user has instructed interruption of the rule generation processing halfway of the processing, the rule obtained as an intermediate result expresses features of data as a whole.

It is desirable that the rule created be as easy to understand as possible to the user. In other words, the smaller the number of IF clause predicate, the better, provided there is no difference in the rule criterion. On the method for reflecting this point in the rule generation is imposed the following restriction: "The accuracy of a rule having an additional IF clause predicate must be higher than that of the original rule." This means that since the resulting rule is more complicated by the addition of an IF clause predicate, its accuracy must inevitably be higher accordingly. By generating a rule with such restriction, the rule obtained is easier to understand and has a high utility value.

Further, in the rule generation processing in this embodiment, rules are generated in consideration of a dependence relation of one-to-many between condition items originally having symbolic value attributes. For example, consider prefecture code and branch code in FIG. 2. Since the branch code is a code peculiar to each branch, once branch code is determined, prefecture code is determined inevitably. The reverse does not exist when there are plural business offices in one prefecture. In this case, it is said that there is a one-to-many relation between prefecture code and branch code.

If a rule is generated for data containing such two condition items, the rule is likely to include both branch code and prefecture code in the IF clause predicate. At least in the tree structure search there is calculated a criterion as a candidate rule. However, this is completely wasteful. If branch code is included in the IF clause predicate, prefecture code is determined inevitably from that branch code, and therefore it is not necessary to add an IF clause predicate relating to prefecture code.

A one-to-many relation between categorical data can also be regarded as an upper-lower relation of classification concepts. More specifically, prefecture code corresponds to an upper classification concept and branch code to a lower classification concept.

The upper-lower relation cannot be expressed in terms of a tree structure. As an example of branch code, a further consideration will now be given to district code and branch scale code (e.g. large, medium and small scales). Since district code is a still higher concept relative to prefecture code, there also exists an upper-lower relation between business office code and district code. Further, once a business office code is designated, a branch scale code is determined inevitably, so here again there exists an upper-lower relation. Thus, both prefecture code and branch scale code are higher concepts relative to branch code. Conversely, one categorical data can contain a plurality of lower concepts (e.g. branch code and customer code relative to prefecture code).

In this embodiment, for condition items there is prepared a list of items corresponding to higher concepts. For example, this list can be prepared automatically from the definitions of to-be-analyzed data shown in FIG. 6. That is, in a relational data base, it is required that the main key of each table be able to designate a record in the table uniquely, and thus there exists a one-to-many relation between the main key item in the table and the other items. In the example of FIG. 6, one-to-many relations are found between branch code and prefecture code and also between branch code and district code. Of course, these relations can also be found out easily and automatically when mutual information volume between condition items is calculated at the time of selection of condition items which has been explained in connection with process 303 in FIG. 3.

When the tree structure search in rule generation is performed by using the above higher concept list, a check is made to see whether a higher or lower concept item relative to the item corresponding to a predicate to be added has already been included in an if clause or not (the check covers not only such direct higher/lower concept but also items present respectively in upper and lower positions of the upper and lower concepts). If such item has already been included, the predicate of that item is not to be added.

The following description is now provided about the contents of the numeric to symbolic value conversion processing using fuzzy division.

In the rule generation processing of this embodiment, the features of the fuzzy division method shown in FIG. 11 are utilized. According to the fuzzy division in FIG. 11, one numerical value is distributed to two symbolic values at most, the sum of which is sure to become 1.0 (for example, like "small" 0.3, "medium" 0.7, "large" 0.0). In terms of expressions found in the rule generating work file 405 which is shown in FIG. 4, "small", "medium" and "large" are allocated to 0, 1 and 2, respectively. In this case, a numerical value x is converted to one real number value y in accordance with the following rule.

Fuzzy symbolic value conversion rule:
If the proportion of "small" is z and that of "medium" is (1−z),
then y=1−z.
If the proportion of "medium" is z and that of "large" is (1−z), then y=2−z.
provided $0 \leq z \leq 1$.

It is here promised that the real number value y between 0 and 1 represents an apportion ratio of the symbols "small" and "medium". According to the features of the fuzzy division in FIG. 11, one numerical value is not distributed to three or more symbolic values, and the sum becomes 1.0, so the above definition causes no contraction.

Cases which have been symbolized fuzzywise by the above method are assumed to be (y1, y2, . . . , yn). It is when calculating the rule criterion that the number of cases is calculated in the rule generation processing. In crispwise division, there is performed a processing of counting the number of cases which satisfy a certain IF clause. The following are based on fuzzy symbolization.

A case corresponding to x1 being "small" is a case having a value of $0 \leq y1 \leq 1$, and the weight thereof is $1-y1$.

A case corresponding to x1 being "medium" is a case having a value of $0 \leq y1 \leq 2$, and the weight thereof is $1-|1-y1|$.

A case corresponding to x1 being "large" is a case having a value of $1 \leq y1 \leq 2$, and the weight thereof is $y1-1$.

Of course, when there are plural IF clause predicates, the weight obtained by multiplying the above weights with respect to the predicates is the weight of all cases. N(A) and N(A&Bi) appearing in the definition of rule criterion are each considered to be the sum of such case weights and treated as a real number value.

If the items which have been converted to symbolic values by fuzzy division in the above processing are used in the rule generation processing, it becomes possible to correctly handle data present near a division boundary, whereby the rules created can be rendered high in accuracy.

In the data present in the work file 405 shown in FIG. 4, the value −1 is assumed to represent a deficit value. There is no fear of this value giving rise to confusion because numerical attributes themselves are not used in the rule generation processing and because symbolic values are allocated in order from 0.

It is here assumed that whether the deficit value itself is to be used or not in the generation of rule depends on the deficit value countermeasure processing in process 303 in FIG. 3 or the contents designated by the user. In the case of using the deficit value in the generation of rule, the rule "If x is a deficit value, . . . ." is allowed. On the other hand, if the deficit value is not used in the generation of rule, it is merely ignored (that is, the deficit value is treated as a symbol not coincident with any symbol). Since the deficit value is a special value, the foregoing fuzzy symbolization rule is not applied.

In this embodiment, the state of progress indicating to what extend the rule generation processing has advanced is displayed. In the rule generation processing, it is possible to calculate beforehand the number of rules to be checked and therefore a numeral indicating the percentage of rules which have already been checked is displayed at an appropriate timing. Processing-skipped rules in disbranching for example are also counted of course.

Figure 14:
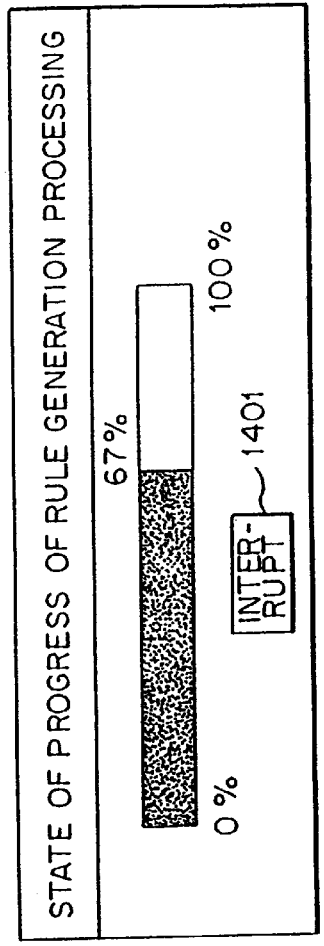
FIG. 14 is a diagram illustrating a display screen for the state of progress of the rule generation processing.

In the rule generation processing it is assumed that user interruption is accepted. A button 1401 for accepting an interruption command is provided in the above mentioned rule generation progress display. FIG. 14 shows an example of display of the progress status of the rule generation processing and that of the interruption button 1401.

In the case where the button 1401 has been clicked to designate interruption of the processing, the next operation is either "continue" or "end". In the case of "continue", the processing is continued as it is, while in the case of "end", the rule generation processing is terminated and the rules so far created are displayed.

FIG. 15 illustrates a flow diagram of the rule generation processing described above. After initialization (1501) involving clearing a candidate rule set and clearing $\mu$th to zero, steps 1503 to 1512 are repeated for all candidates. First, the criterion $\mu$ is calculated (1503) and then it is compared with $\beta$th (1504). If $\mu > \mu$th, the candidate rule concerned is added to the candidate rule set (1505), and a minimum criterion in the candidate rule set is set to $\mu$th (1506). If $\mu \leq \mu$th, an estimated maximum value $\mu$max of criterion relating to subnode is calculated (1507) and then it is compared with $\mu$th. If $\mu$max<$\mu$th, all the subnodes are regarded as having already been evaluated (1509).

Next, the state of progress of the rule generation processing is displayed (1510) and judgment is made as to whether interruption of the processing has been instructed or not (1511). If the answer is affirmative, escape from the loop follows. When the loop processing is over for all the candidates or when escape is made from the loop in step 1512, the candidate rule set is outputted (1513) and the processing is terminated.

The following description is now provided about the processing which is executed by the rule learning processing execution module 403 shown in FIG. 4.

Figure 16A:
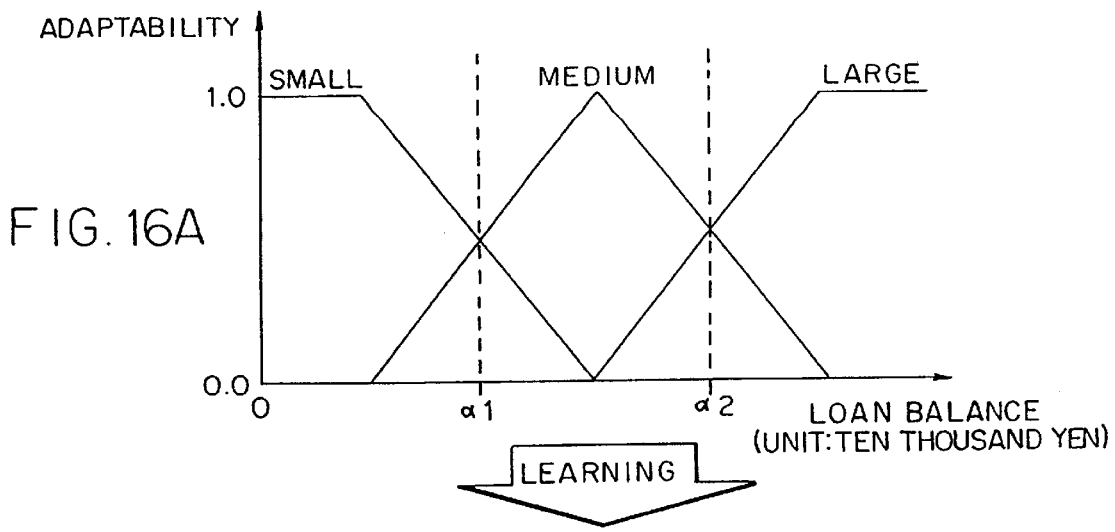
FIGS. 16A and 16B are diagrams illustrating an example of change in the membership function shape by learning.
Figure 16B:
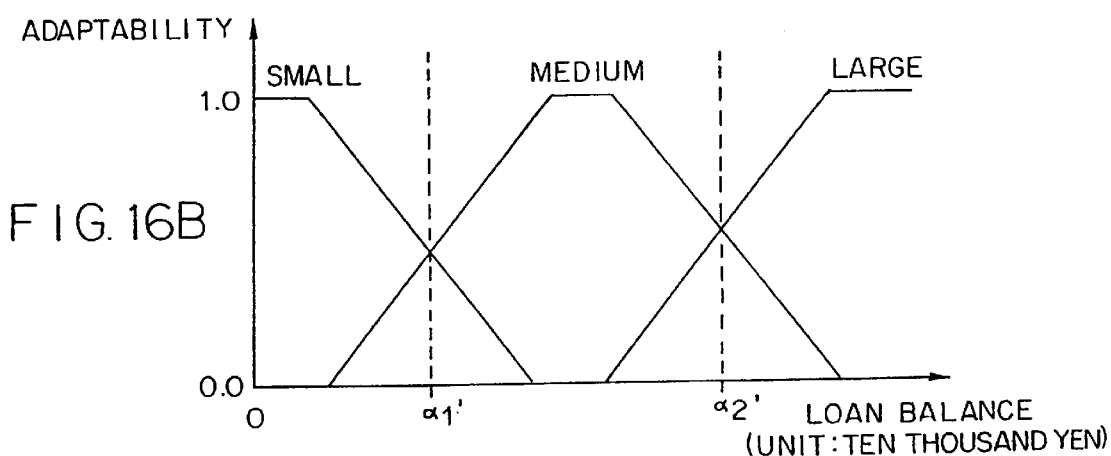
Figure 17:
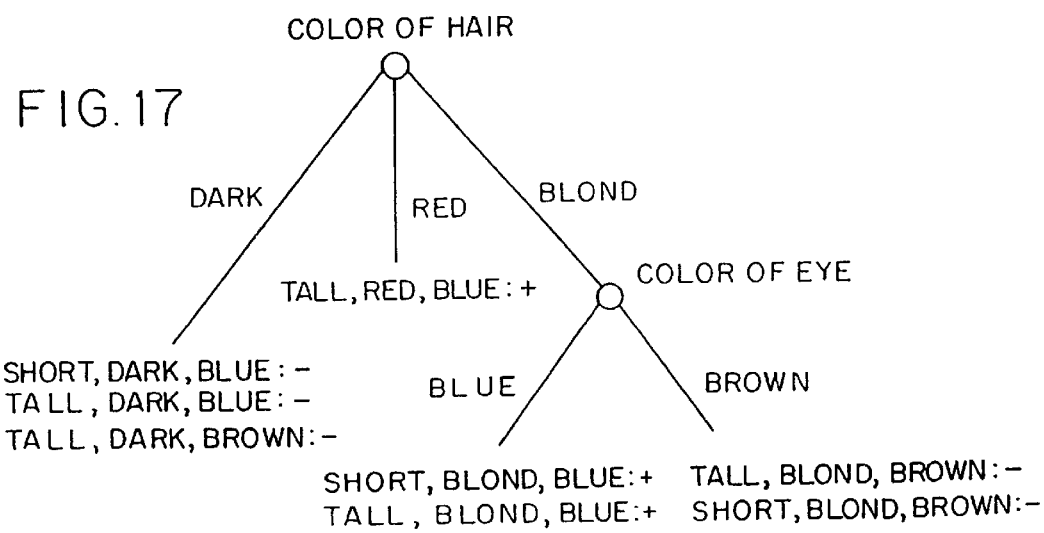
FIG. 17 is a diagram illustrating a conventional classification method.

FIG. 16 shows shape parameters of membership functions for learning. In this embodiment, parameters to be adjusted by learning are assumed to be division points $\alpha 1$ and $\alpha 2$. That is, with respect to the rules created in the rule generation processing, there are determined division points $\alpha 1$ and $\alpha 2$ at which the rule criterion becomes largest. But the rule generation processing using fuzzy division assumes the property that one numerical value is distributed to two symbolic values at most and that the sum of those values is sure to become 1.0. Therefore, the values of $\alpha 1$ and $\alpha 2$ are varied only within the range which satisfies the assumption. Also illustrated in FIG. 16B is an example of membership function shapes after learning.

Concrete learning takes the following steps.

Step 1: Rules to be learned are designated. The user designates which rules are to be learned.

Step 2: Steps 3 to 8 are repeated until a learning end condition is established.

Step 3: Amount of change is set at $\triangle \alpha i=0$ ($i=1, 2, \ldots, m$) with respect to each parameter, m being the total number of division-point parameters to be adjusted.

Step 4: Steps 5 to 7 are repeated for each of the rules designated.

Step 5: The criterion $\mu$ of the rule being processed is calculated and at the same time $\partial N(A)/\partial \alpha i$, $\partial N(B)/\partial \alpha i$, and $\partial N(A\&B)/\partial \alpha i$ are calculated. N(A) represents the number of cases satisfying the condition part A (taking fuzzy division into consideration), and an amount of change $\triangle N(A)$ caused by changing $\alpha i$ a slight amount $\triangle \alpha$ can be determined easily from the membership function shapes in FIGS. 16A–16B. The values of $\partial N(B)/\partial \alpha i$ and $\partial N(A\&B)/\partial \alpha i$ are also determined in the same way.

Step 6: From the definition equation (4) of $\mu$# and the values obtained in step 5, $\partial \mu/\partial \alpha i$ ($i=1 \ldots, m$) is determined using a relational expression of $\partial \mu/\partial \alpha i = \partial N(A)/\partial \alpha i \cdot \partial \mu/\partial N(A) + \partial N(B)/\partial \alpha i \cdot \partial \mu/\partial N(B) + \partial N(A\&B)/\partial \alpha i \cdot \partial \mu/\partial N(A\&B)$.

Step 7: $\triangle \alpha i \leftarrow \triangle \alpha i + \partial \mu/\partial \alpha i$ is set for all i's.

Step 8: $\alpha i \leftarrow \triangle \alpha i + \lambda \cdot \triangle \alpha i$ is set for all i's, wherein $\lambda$ is a predetermined learning coefficient.

Step 9: The value of $\alpha i$ after learning is outputted to the rule file 407 shown in FIG. 4.

As the end condition in step 2 there may be used, for example, any or a combination of the following conditions:

Steps 3 to 8 have been repeated by a designated number of times.

has been established for all i's ($\epsilon$ is a predetermined positive constant).

A change $|\Delta\mu|<\epsilon$ in the rule criterion $\mu$ has been establish.

Through the above processing, membership function parameters which maximize the criterion of one or plural rules can be determined automatically by learning. As a result, it becomes possible to not only extract regularity and causality present between rules more accurately but also optimally determine division points themselves of optimum item values for the explanation of regularity. According to this learning, moreover, since it is possible to optimize the sum of criteria of all rules created or of a partial set thereof, only the rules meaningful to the user can be optimized by learning and hence it is possible to generate rules of higher utility value.

According to the present invention, as set forth hereinabove, the following effects can be attained.

First, since regularity and causality present between data can be extracted in the form of a rule which is easier to understand to users, it becomes possible to effectively utilize a large volume of data which has been difficult with the conventional method. Particularly, in the analysis of check data in the manufacturing process and consequent analysis of a failure factor, or in the analysis of a customer data base and consequent planting of a marketing strategy for a new commodity, it becomes possible to extract effective information from the data base.

Further, since items to be used in the generation of rule can be selected automatically from among the items contained. in the data base and also as to the other processing parameters there are provided default values. Thus, even a user not having a detailed knowledge on the properties of data can execute the data analyzing processing in a nearly automatic manner without the need of performing any complicated preprocessing. Therefore, it becomes possible to provide an analyzing method extremely easy to use.

Moreover, since numerical data contained in the data base are converted to symbolic values before use in the generation of rule, it is possible to find out a regularity corresponding to a macro structure even for data of large noise, and hence there can be obtained a result higher in utility value to the user.

If the foregoing conversion to symbolic values is performed fuzzywise, it is possible to minimize the loss of information caused by the conversion to symbolic values and extract rules high in accuracy.

Even in the case where a deficit value is contained in data, the deficit value can be used in the generation of rule on the ground of it being meaningful, or can be treated merely as unknown data, so there is attained the effect that even data containing a deficit value can be utilized effectively. Further, since related judgments can be made automatically, it is possible to execute the analysis processing more easily.

Since the rule generation processing is executed while evaluating a maximum value of rule criterion obtained in the case of creating a more complicated rule, it is possible to avoid the generation of a wasteful candidate rule and hence possible to generate rules at a higher speed.

As to the rule generation processing parameters, since optimum values are generated automatically according to the number of data and of data items, the user can execute the processing without being troubled by the designation of minute parameters.

In connection with the rule criterion, since both cover ratio and accuracy are considered and the user can designate the priority of these two factors, it is possible to generate rules conforming to the purpose of utilization intended by the user.

In the fuel generation processing, the state of progress of the processing is displayed. Thus, it is possible to make interruption halfway in the processing, and permit the use of interim results when interruption is made. Therefore, in the case where the rule generation processing takes time, it is possible to lighten the user's burden and improve the working efficiency.

Further, since a dependence relation between items given as symbolic values can be determined from data definition information or the distribution of data themselves to prevent a redundant rule from being created in the generation of rule, there is attained the effect that rules which are simpler and easier to understand for the user can be generated at high speed.

Further, using the generated rules, parameters relating to the method of conversion to symbolic values can be optimized by learning, and therefore it is possible to generate rules which are high in both accuracy and utility value.

While the present invention has been described in detail and pictorially in the accompanying drawings it is not limited to such details since many changes and modifications recognizable to those of ordinary skill in the art may be made to the invention without departing from the spirit and the scope thereof.

What is claimed is:

1. A data analyzing method of generating rules based on an analysis performed on a plurality of data items stored in a database by using a processing unit, said method comprising the steps of:

selecting data items in said database for use in an IF clause based on a designation inputted from an input device;

selecting data items in said database for use in a THEN clause based on a designation inputted from said input device;

converting numerical values into symbolic values when said selected data items include said numerical values;

when the value of a certain data item present within records included in said database to be analyzed includes a deficit value, adding a symbolic value indicative of the deficit value as a symbolic value of said data item;

determining, for each data item according to a statistical process, whether the symbolic value indicating the deficit value is to be used or not in the rule to be created; and generating plural candidate rules by analyzing data items stored in said data base, each rule expressing a correlation between said selected data items, wherein said rule is usable to describe the effect the data items in the database have on a selected data item.

2. A data analyzing method according to claim 1, wherein number of selectable data items is less than a predetermined value.

3. A data analyzing method of generating rules based on an analysis performed on a plurality of data items stored in a database by using a processing unit, said method comprising the steps of:

selecting data items in said database for use in an IF clause based on a designation inputted from an input device;

selecting data items in said database for use in a THEN clause based on a designation inputted from an input device;

converting numerical values into symbolic values when said selected data items include said numerical values;

when the value of a certain data item present within records included in said database to be analyzed includes a deficit value, adding a symbolic value indicative of the deficit value as a symbolic value of said data item;

deciding whether the symbolic value indicative of the deficit value is to be used automatically based on a dependence relation between said data item and a conclusion item; and generating plural candidate rules by analyzing data items stored in said data base, each rule expressing a correlation between said selected data items, wherein said rule is usable to describe the effect the data items in the database have on a selected data item.

4. A data analyzing method of generating rules based on an analysis performed on a plurality of data items stored in a database by using a processing unit, said method comprising the steps of:

selecting data items in said database for use in condition and conclusion clauses based on a designation inputted from an input device;

converting numerical values into symbolic values when said selected data items include said numerical values;

when the value of a certain data item present within records included in said database to be analyzed includes a deficit value which is determined according to an attribute of said data item, adding a symbolic value indicative of the deficit value as a symbolic value of said data item; and generating plural candidate rules by analyzing data items stored in said data base, each rule expressing a correlation between said selected data items, wherein said rule is usable to describe the effect the data items in the database have on a selected data item.

* * * * *